United States Patent [19]

Makimura et al.

[11] Patent Number: 5,361,217
[45] Date of Patent: Nov. 1, 1994

[54] POSITION MEASURING/PLOTTING APPARATUS

[75] Inventors: Kazuo Makimura; Shigeru Kojima; Haruo Kakizawa, all of Ohmiya, Japan

[73] Assignee: Fuji Photo Optical Co., Ltd., Ohmiya, Japan

[21] Appl. No.: 57,996

[22] Filed: May 5, 1993

[30] Foreign Application Priority Data

| | | | |
|---|---|---|---|
| May 7, 1992 | [JP] | Japan | 4-142189 |
| Jun. 25, 1992 | [JP] | Japan | 4-191668 |
| Jul. 20, 1992 | [JP] | Japan | 4-214508 |
| Jul. 20, 1992 | [JP] | Japan | 4-214509 |

[51] Int. Cl.$^5$ ............................................. G06F 15/20
[52] U.S. Cl. ........................................ 364/561; 356/3; 356/4; 356/375
[58] Field of Search .................... 356/1, 3, 4, 375; 364/561

[56] References Cited

U.S. PATENT DOCUMENTS

| | | | |
|---|---|---|---|
| 3,035,176 | 5/1962 | Kis et al. | 356/3 X |
| 3,471,234 | 10/1969 | Studebaker | 356/3 |
| 3,504,182 | 3/1970 | Pizzurro et al. | 356/4 X |
| 3,765,764 | 10/1973 | Niss | 356/3 X |
| 4,567,347 | 1/1986 | Ito et al. | 356/4 X |
| 4,708,483 | 11/1987 | Lorenz | 356/375 X |
| 4,973,156 | 11/1990 | Dainis | 356/1 X |
| 5,150,169 | 9/1992 | Van Wagoner | 356/375 X |

FOREIGN PATENT DOCUMENTS 2-281380  11/1990  Japan .

*Primary Examiner*—Edward R. Cosimano
*Attorney, Agent, or Firm*—Price, Heneveld, Cooper, DeWitt & Litton

[57] ABSTRACT

A position measuring/plotting apparatus and a position indicator are used in plotting a plan view representing a situation, for example, the site of a traffic accident. The position measuring/plotting apparatus generally includes a position detector to detect spatial coordinates of targets, a processor to detect plane coordinates of the targets based on the spatial coordinates, and a plan view plotter to plot a plan view based on the data regarding those plane coordinates. The position indicator comprises a plurality of targets fixedly mounted on a supporting rod having an end serving to indicate a position of a scene component. Each target includes a reflector adapted to reflect a light beam projected thereon and light emitters used to project light beams by which the target is detected by the position detector. The position detector comprises a light emitter to project a light beam on the target and a light receiver to detect the light beam reflected on the target to thereby detect spatial coordinates of the target. The spatial coordinates of the target detected by the position detector are processed by the processor to obtain plane coordinates corresponding to the position indicated by the end of the supporting rod. A plan view is then plotted by the plan view plotter based on the plane coordinates. Various kinds of information regarding the target, the supporting rod and the other components are superimposed on the light beams for target detection and the light receiver of the position detector used exclusively to detect these light beams identifies those various kinds of information.

16 Claims, 21 Drawing Sheets

POSITION MEASURING/PLOTTING APPARATUS

BACKGROUND OF THE INVENTION

Technical Field

This invention relates to a position measuring/plotting apparatus used to measure coordinates corresponding to positions of given scene components placed to configure an actual site of, for example, a traffic accident and thereby to plot a plan view as a sketch of the actual site, and further to a position indicator used by this position measuring/plotting apparatus in order to indicate the positions to be measured for determination of distances to given scene components.

Prior Art

It is essential for inspection of a traffic accident to analyze the situation and the configuration of an actual accident site. Based on such on-site inspections, police officers draw up a protocol including a sketch (plan view) of the actual site which identifies relative distances, as well as relative positions of relevant components lying near the accident site, such as buildings, structures and victim cars, as illustrated by FIG. 22 of the accompanying drawings.

To make such a sketch of the actual accident site, the inspectors have conventionally measured the relative distances of the relevant subjects utilizing tapelines, and plotted a desired plan view based on these measurements. However, measurement with tapelines has inconveniently required not only many hands but also a traffic blockade for a long period. If the actual site has a high traffic density, taking the measurements will necessarily cause a traffic snarl, and often place the inspectors in danger of being hit by a car passing by them. To avoid such problem, the inspectors' time on the road, and thus at the work site, should be minimized.

In view of the problem mentioned above, the applicant proposed a position measuring/plotting apparatus improved over the prior art so that the apparatus can be easily operated to make a measurement, as well as a sketch, of an actual traffic accident within a time and comparison of this sketch with the actual accident site can be facilitate (Japanese Patent Application Disclosure Gazette No. 1990-281380). According to the invention disclosed in the above-identified application, targets previously set up at desired positions of an actual site, such as an accident site or the like, are photographed by suitable photography equipment, such as a television camera. Simultaneously, the targets are indicated by a suitable indicator, such as a cursor on a display adapted to display the picture thus photographed so that a measuring head including photographing equipment and a position detector may be directed to the indicated targets and then distances, as well as angles between a reference point and the respective targets, may be detected by the position detector in order to calculate coordinates of these targets. A sketch of the actual site may be made on drafting paper, or the sketch display, based on the calculated coordinates.

However, the targets detected by the above-mentioned position measuring/plotting apparatus of the prior art are immovably set up in association with the respective scene components and therefore the number of targets must be substantially the same as the number of the components. Additionally, these targets are set up on the road surface adjacent the associated scene components. It is therefore difficult to make position measurements across a victim car if any obstacle lies between the photographing equipment, or position detector, and the target.

SUMMARY OF THE INVENTION

Accordingly, it is an object of the invention to eliminate the need for providing the same number of targets as the number of scene components. This is achieved by fixedly mounting the targets on a supporting pole adapted to be moved from one point associated with one scene component to another point associated with another scene component to be measured and to indicate, with its pointed end, the scene component to be measured. Targets fixedly mounted on the supporting pole are detected and coordinates of the pole's pointed end are based on data obtained in connection with the targets.

The object set forth above is achieved, according to the invention, by a position indicator for use in a position measuring/plotting apparatus generally consisting of a supporting rod having at least one pointed end adapted to be fixed into, for example, a road surface at a position being measured and targets fixedly mounted on the supporting rod to reflect a light beam projected thereon in a predetermined direction. The position measuring/plotting apparatus includes a position detector having a light emitter to project a light beam on the target and a light receiver adapted to detect the light beam reflected on the target so that a distance, as well as a direction, to the target may be determined to detect spatial coordinates of the target. A processor is used to process a plurality of spatial coordinates detected by said position detector with respect to positions occupied by respective targets and thereby to detect respective plane coordinates of the targets. A plan view plotter is used to plot a plan view based on the plane coordinates detected by the processor.

However, such measurement performed using the supporting pole requires an operator to hold the pole and an additional operator to operate the position measuring/plotting apparatus itself. If a distance between these operators is relatively large, they must use transceivers, or the like, to mutually exchange information relating to a state of the pole, e.g., whether the pole properly indicates a given position, or which pointed end of the pole is indicating the given position. The information exchanged in such manner must be repeated for each scene component, and therefore such measurement will be time consuming for a large number of scene components, slowing down the progress of the operation.

Accordingly, it is another object of the invention to allow desired data relating to the targets to be obtained by the position detector as soon as the targets are detected by the position detector.

This object is achieved, according to the invention, by a position measuring/plotting apparatus wherein each target has a reflector placed at an appropriate position within the target to reflect a light beam projected thereon in a predetermined direction. Each target includes light emitters which project light beams used exclusively for target detection. Various kinds of information may be superimposed on the light beams used for target detection. A position detector includes a coordinate detector having its own light emitter to project a light beam on the target and a light receiver adapted to detect the light beam reflected on the target so that a distance, as well as a direction to the target, may be determined to detect spatial coordinates of the target. A separate light receiver receives the light beams for target detection. An information identifier identifies the various kinds of information. A processor is used to process a plurality of spatial coordinates detected by the position detector with respect to the position occupied by respective targets and, thereby, to detect respective plane coordinates of the targets. A plan view plotter plots a plan view based on the plane coordinates detected by the processor. The light beams used for target detection are detected by the separately provided light receiver of the position detector and thereby the spatial coordinates of the targets are detected.

To expedite the operation of measuring, it is desired that all the scene components can be position-measured without moving the photographing equipment and the position detector from their initial placements. However, it is often impossible to measure the positions of all the scene components with the photographing equipment and the position detector fixed at their initial placements because the traffic accident often happens at crossroads, particularly at crossroads being of poor visibility due to obstacles and such obstacles make the desired position measuring difficult, depending on the scene components.

In such case, it is necessary to use two or more position/measuring plotting apparatuses, one of which is moved from one point to another point for unobstructed measurement of the scene components in question along appropriate directions.

To achieve this, it is still another object of the invention to plot a desired plan view based on data obtained by a single position measuring/plotting apparatus moved from one placement to another placement, or based on a combination of data obtained by a plurality of position measuring/plotting apparatuses.

This object is achieved, according to one aspect of the invention, by a position measuring/plotting system comprising first and second position measuring/plotting apparatuses, each comprising targets, each target placed at an appropriate point to reflect a light beam projected thereon in a predetermined direction. A position detector has a light emitter to project a light beam on the target and a light receiver adapted to detect the light beam reflected by the target so that a distance, as well as a direction, to the target may be determined to detect spatial coordinates of the target. A processor processes a plurality of spatial coordinates detected by the position detector with respect to positions occupied by respective targets and thereby detects respective plane coordinates of the targets. A plan view plotter plots a plan view based on the plane coordinates detected by the processor. A recorder stores the data regarding the plan view. When a plan view of a given scene component is plotted using the first and second position measuring/plotting apparatuses, two or more point positions are measured by the second apparatus to calculate second coordinates serving as a reference coordinates, which are then superimposed on first coordinates obtained by the first apparatus to calculate coordinates representing a position at which the second apparatus is set up with respect to a coordinate system obtained by the first apparatus, and then coordinates of the scene component obtained by the second apparatuses are combined with the coordinates obtained by the first apparatus to plot the plan view.

Traffic accidents may happen repeatedly at crossroads having poor visibility, and sometimes making a sketch for a new accident may be expedited by utilizing a road map, or the like, that was made for a previous accident at the same site. It should be understood, however, that the relevant scene components must be position-measured anew since each accident is different even when they occur at the same site.

If the sketch of the actual site can be made rapidly, the duration of a traffic blockade for inspection of the actual accident site can be correspondingly shortened, and thereby a traffic snarl that would otherwise be caused can be effectively alleviated. Furthermore, a danger that the operators might be hit by a car passing by them can also be reduced.

Accordingly, it is another object of the invention to expedite the operation of sketching an actual accident site, and thereby to simplify the operation of measuring, by position-measuring the relevant scene components at one accident site from a plurality of points, or by superimposing the data obtained by the position measuring/plotting apparatus set up at a new point on a plan view plotted by the position measuring/plotting apparatus set up at another point, if one or more traffic accidents happened at the same site in the past.

This object is achieved, according to another aspect of the invention, by a position measuring/plotting apparatus comprising targets, each placed at an appropriate position to reflect a light beam projected thereon in a predetermined direction. A position detector has a light emitter to project a light beam on the target and a light receiver to detect the light beam reflected by the target, so that a distance, as well as a direction to the target, may be determined to detect spatial coordinates of the target. A processor used to process a plurality of spatial coordinates detected by the position detector with respect to positions occupied by respective targets, detects respective plane coordinates of the target. A plan view plotter plots a plan view based on the plane coordinates detected by the processor. A recorder divides configuration components contained in the plan view into movable components and immovable components, and then separately stores the data regarding these movable and immovable components. The movable components and/or the immovable components are called from the recorder and provided to the plan view plotter.

BRIEF DESCRIPTION OF THE DRAWINGS

FIGS. 17(a) and 17(b) are diagrams illustrating details of processing shown by FIG. 19, in which FIGS. 17(b) is a diagram as viewed from a line A—A in FIG. 17(a);

DETAILED DESCRIPTION OF THE PREFERRED EMBODIMENTS

Figure 2:
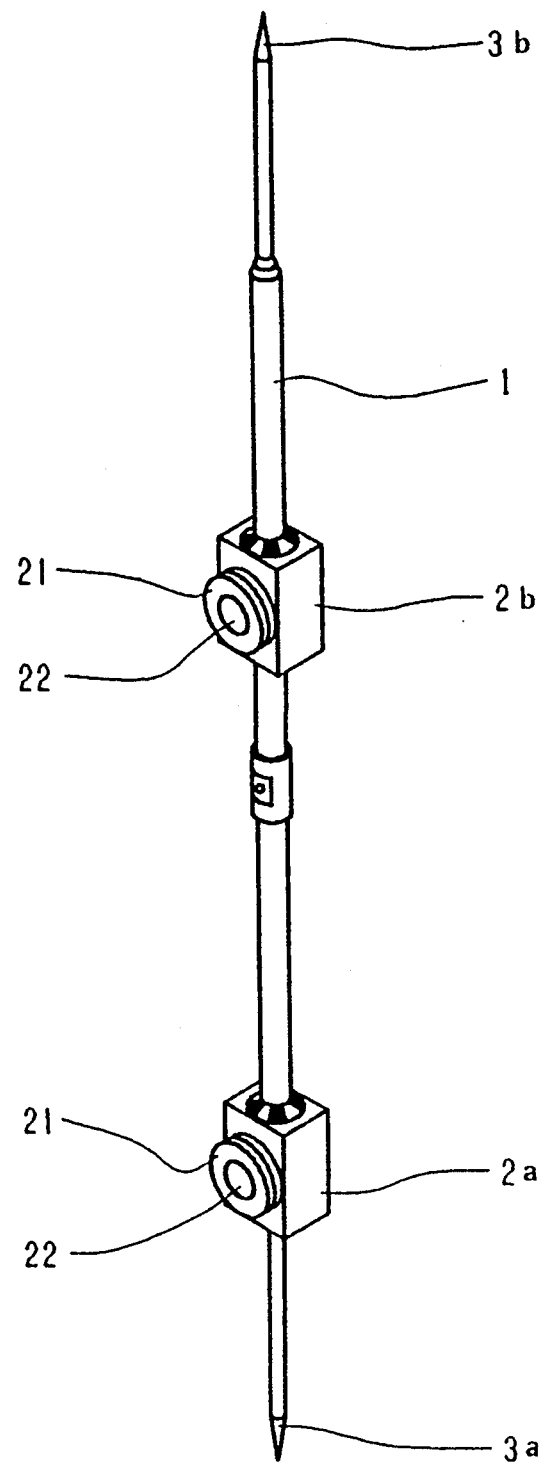
FIG. 2 is a perspective view of the position indicator constructed according to the invention.

FIG. 2 is a schematic perspective view of a position indicator constructed according to the invention comprising a pole 1 serving as a supporting rod, a first target 2a and a second target 2b fixedly mounted on pole 1 at appropriate positions. Pole 1 has opposite ends 3a, 3b which are pointed and one of which can be selectively fixed into the ground or road surface at a position being measured to hold pole 1 vertically. When pole 1 is held with end 3a fixed into the road surface, a first target 2a will be at a lower position and a second target 2b will be at an upper position. When pole 1 is held with the end 3b fixed into the road surface, the first target 2a will be at the upper position and the second target 2b will be at the lower position. Light beams for range finding (range finding light beam) are projected from the position detector onto these targets 2a, 2b and reflected by these targets 2a, 2b in a predetermined direction, as will be described later.

Figure 3:
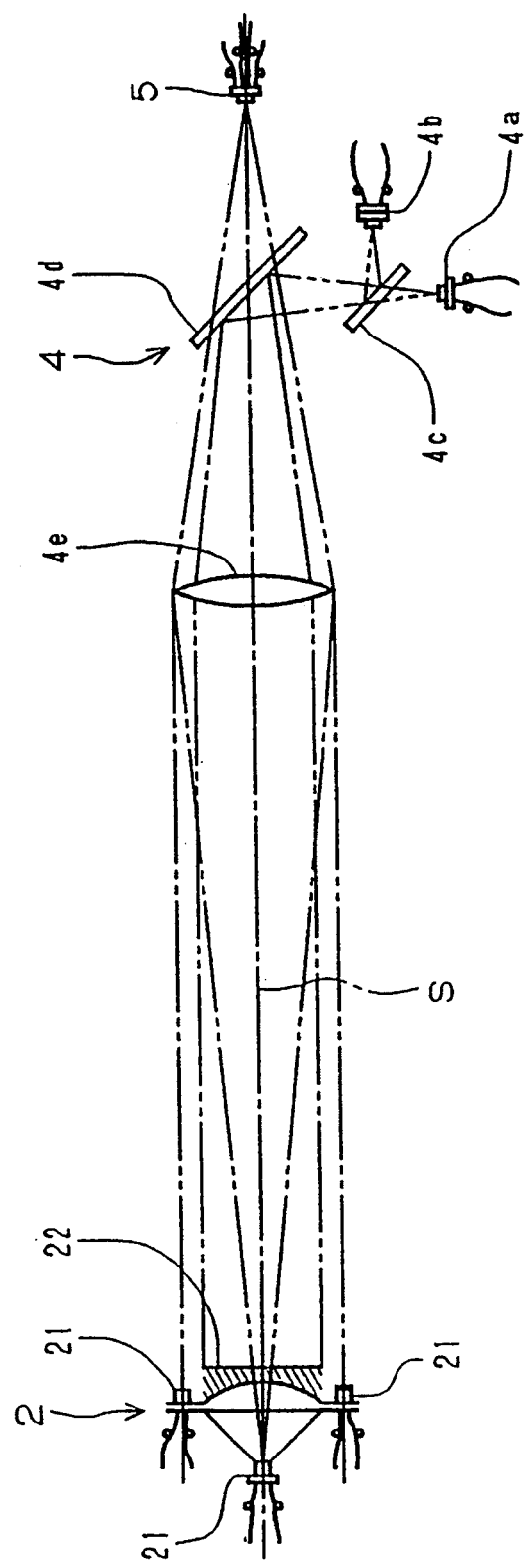
FIG. 3 is a schematic diagram illustrating arrangement of the device used in the position detector to aim at a target.
Figures 4A, 4B:
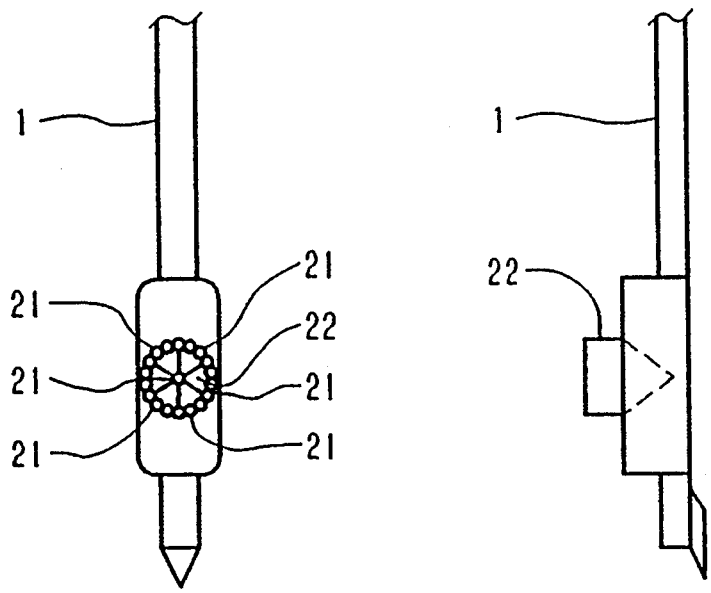
FIG. 4(*a*) is a front elevational view of a target; 4(*b*) is a side elevational view of the target according to FIG. 4(*a*)

FIG. 3 schematically shows the arrangement of the position detector 4 and the target 2. Target 2 comprises light sources 21, such as LEDs serving as light emitters used to project light beams for target detection, and a reflector 22 serving to reflect the range finding light beam being incident thereon in a predetermined direction. As will be seen in FIG. 4(a), the light sources 21 are arranged in a circle around the reflector 22. A light source 21 is also provided at the center of reflector 22. Light source 21 provided at the center of reflector 22 improves controllability since, even when an image of the circular light source 21 becomes relatively large during measurement at a short enough range that a four-division photoconductive element is enclosed, as will be described later, the central light source 21 functions to avoid a condition where there is no light beam (light beam for target detection) incident upon the photoconductive element. The light beams for target detection emitted from the first target 2a and the second target 2b may have different modulation frequencies for identification of these two targets.

Referring to FIG. 3, the position detector 4 is provided with a light emitting element 4a for range finding as a light emitter and a photoconductive element 4b for range finding as a light receiver so that a light beam projected from the light emitting element 4a on the target 2 is reflected by reflector 22 (FIGS. 4a and 4b) to the photoconductive element 4b (FIG. 3). The light beam emitted from the light emitting element 4a for range finding is transmitted by a beam splitter 4c and then reflected by a beam splitter 4d substantially along a direction perpendicular to the beam splitter 4d into the target 2. The light beam reflected by target 2 is then reflected by the beam splitter 4d and then reflected by the beam splitter 4c into the photoconductive element 4b for range finding. There is provided behind the beam splitter 4d a light receiver 5 serving to detect target 2 such that the light beams for target detection emitted from the light sources 21 of target 2 pass through beam splitter 4d and are incident on the light receiver 5 for target detection. There is provided an objective 4e in front of the beam splitter 4d.

Figure 5:
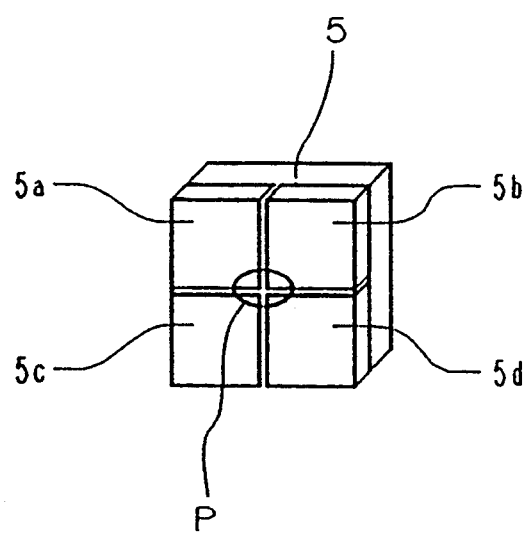
FIG. 5 is a schematic perspective view illustrating arrangement of the light receiver for target detection.

Referring to FIG. 5, light receiver 5 for target detection comprises a multi-division photoconductive element such as a four-division photoconductive element. In the case of the four-division photoconductive element, output signals from respective sub-elements 5a, 5b, 5c, 5d are applied to a position computing device (not shown) in which a series of operations are performed as follows:

$$(Ea+Eb)-(Ec+Ed)=K \quad (2)$$

$$(Ea+Ec)-(Eb+Ed)=L \quad (2)$$

where Ea, Eb, Ec, Ed represent values of the output voltages from the sub-elements 5a, 5b, 5c, 5d, respectively. These values Ea, Eb, Ec, Ed of the output voltages depend on the positions at which the light beams for target detection are incident on the light receiver 5, e.g., if all of four output voltages are not equal to "0" and values of both K and L given by equations (1) and (2) are equal to "0," it is suggested that the light beams for target detection emitted from light sources 21 are incident on a central zone of the light receiver 5, as indicated by P in FIG. 5.

Figure 9:
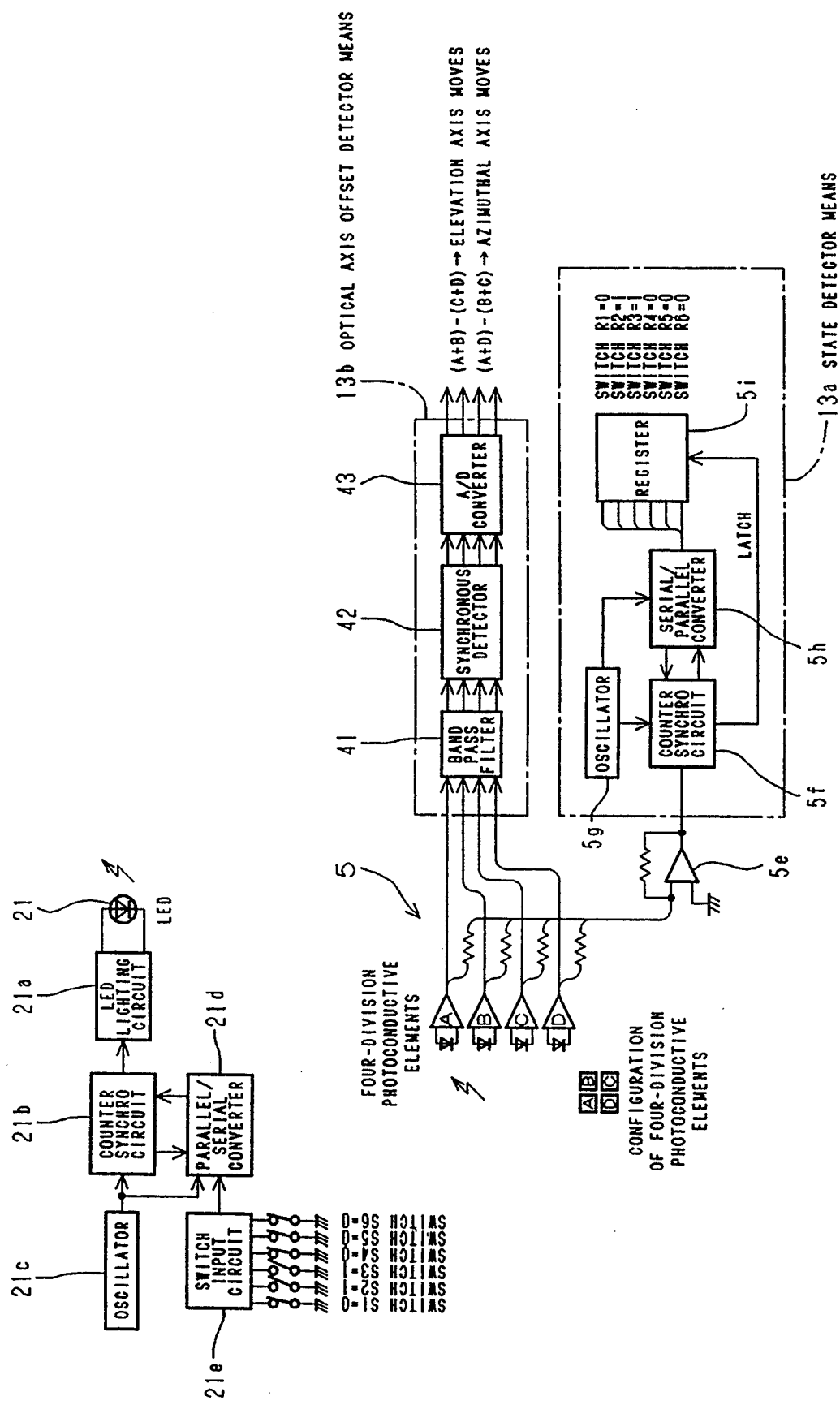
FIG. 9 is a schematic circuit block diagram of the target and the state detector making a part of the position detector.

Referring to FIG. 9, a state detector 13a serving as information identifier is connected to the light receiver 5 for target detection so that a state of pole 1 may be detected based on a state signal contained in the light beams detected by the light receiver 5.

The arrangement of the position measuring/plotting apparatus of the invention will now be described with reference to FIGS. 1 and 6–10.

Figure 1:
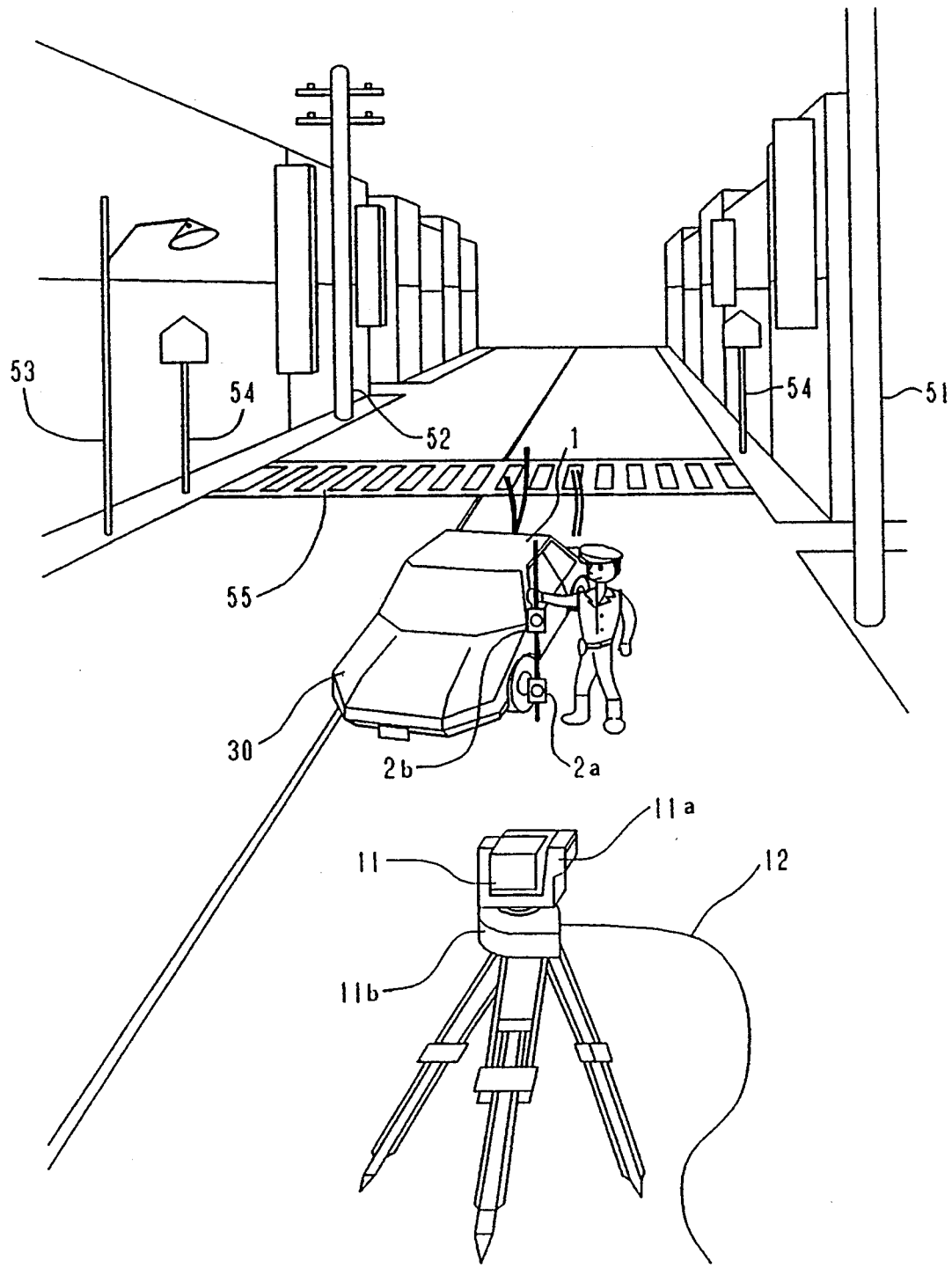
FIG. 1 is an illustration used to make a sketch of an actual site, in which the position indicator of the invention indicates relevant scene components and, in turn, the position indicator is detected.

FIG. 1 illustrates an actual site to be sketched. For example, the site could be the location of a traffic accident. A measuring head 11 comprises a combination of photographing equipment 6 (see FIG. 7) such as a television camera and a position detector 4 placed at an appropriate point to photograph a configuration of the actual site. The position detector 4 and the photographing equipment 6 have their optical axes extending parallel to each other. The optical axis of the position detector 4 extends through the center of target 2 as the photographing equipment 6 picks up the target 2 substantially in a central zone of the photographing frame and the optical axis of the measuring head 11 is oriented so that both K and L given by the equations (1) and (2), respectively, take a value of "0." The measuring head 11 is supported by vertically rotatable mechanism 11a adapted for selectively adjusting the optical axis of the measuring head 11 in the vertical plane and horizontally rotatable mechanism 11b adapted for selectively adjusting the optical axis in the horizontal plane so that the optical axis of the measuring head 11, i.e., an optical axis S of the position detector 4 (see FIG. 3), may be appropriately oriented by operation of these rotatable mechanism 11a. 11b.

Figure 6:
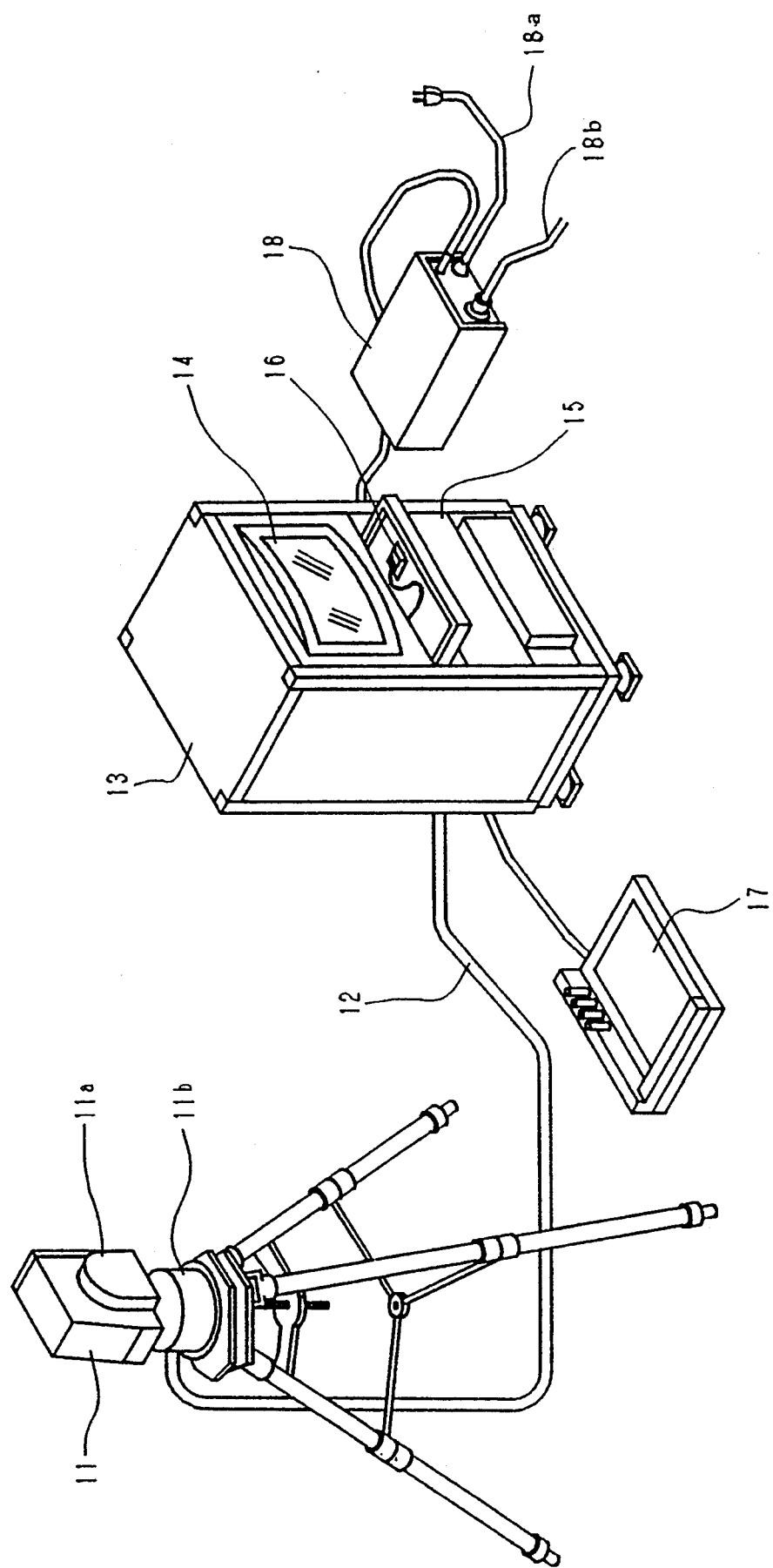
FIG. 6 is a schematic perspective view illustrating the position measuring/plotting apparatus particularly in connection with the control unit.

Referring to FIG. 6, a control unit 13 is connected by a cable 12 to the measuring head 11 and the position computing device is included in this control unit 13. The control unit 13 further includes a picture display 14, such as a CRT used to display a picture photographed by the photographing equipment 6 included in the measuring head 11, and a computer 15 used to perform input/output processing and calculation. A mouse 16 serving as an input, used to input information regarding an actual site sketch to be made, and an X-Y plotter 17, used to print the sketch, are connected to the computer 15. The control unit 13 is energized from a backup power source 18 which can be, in turn, connected by a cord 18a to a commercial power source and by a cord 18b to a vehicle battery.

Figure 7:
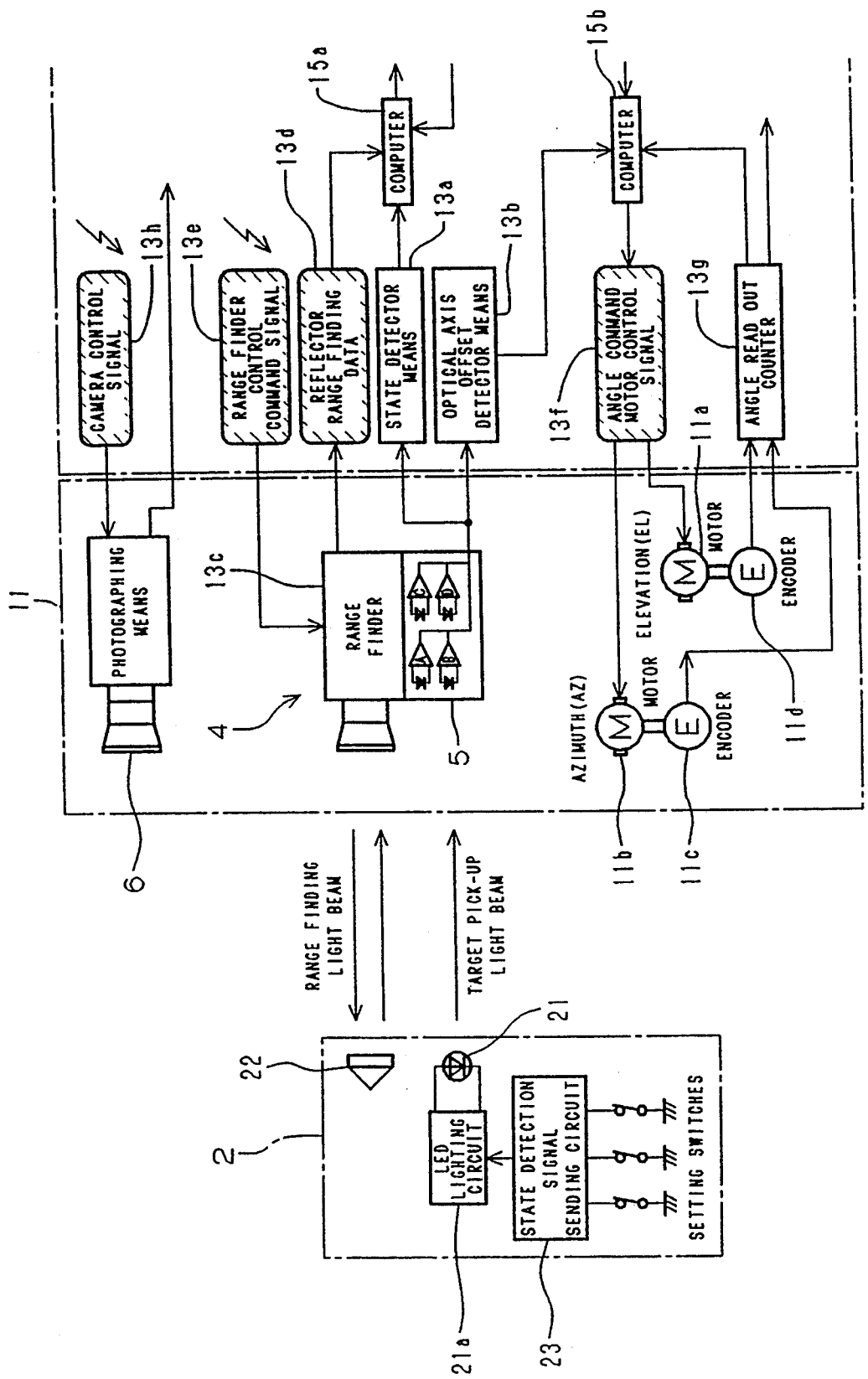
FIG. 7 is a block diagram showing a part of the target and the position measuring/plotting apparatus as overlapping with FIG. 8.
Figure 8:
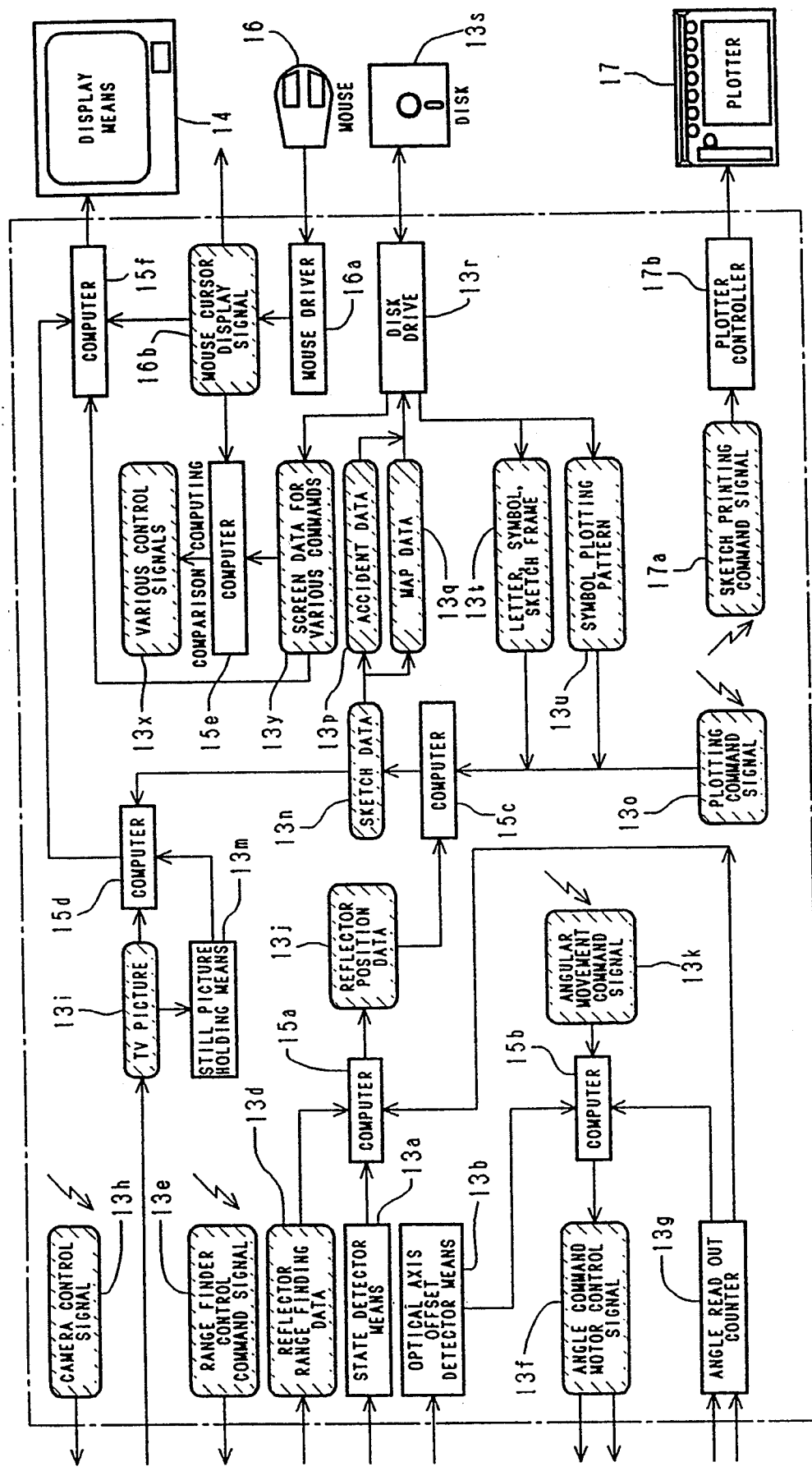
FIG. 8 is a block diagram showing a part of the target and the position measuring/plotting apparatus as overlapping with FIG. 7.

FIGS. 7, 8 and 9 are block diagrams illustrating the arrangement of the position measuring/plotting apparatus and a part of signals. As illustrated, the light sources 21, which may be provided by LEDs, are driven by a LED lighting circuit 21a adapted to drive the light sources 21 in response to output signals from a state detecting circuit 23 adapted to detect states of various switches.

Figure 10:
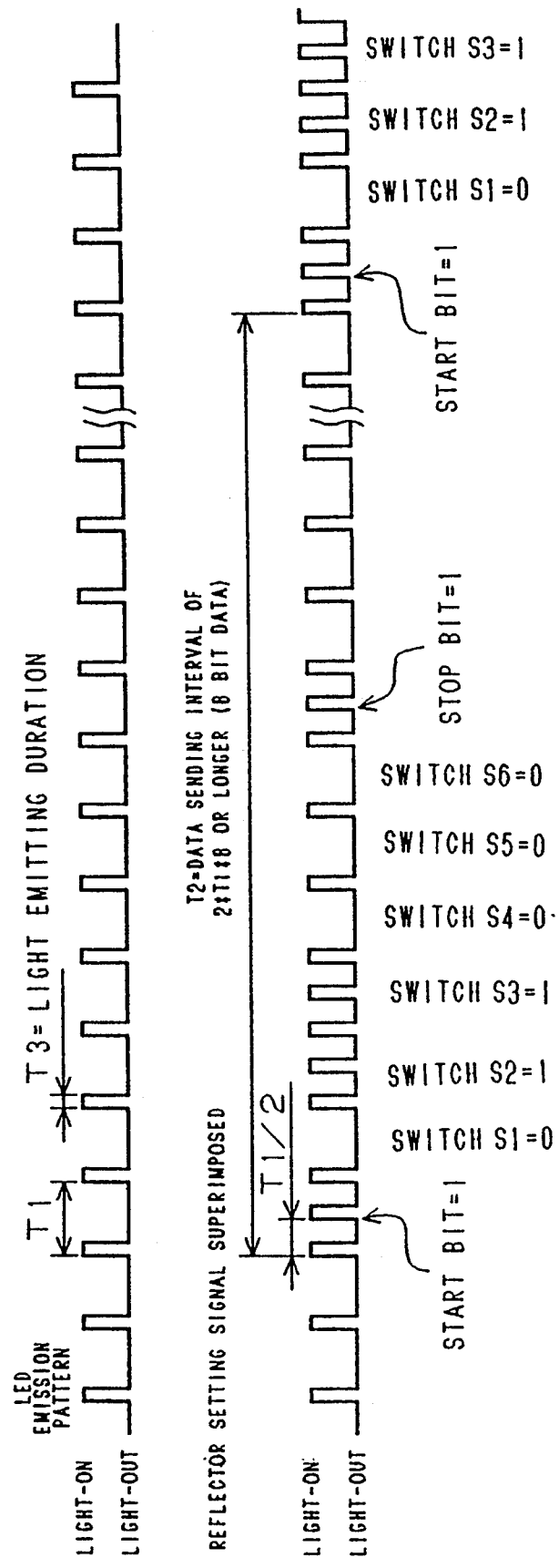
FIG. 10 is a time chart of the light beam for target detection emitted from the target of the position of the position indicator and the light beam for target detection having the state signal superimposed thereon.

FIG. 10 is a time chart of the light beam for target detection emitted from the light source 21 of each target 2, in which the time chart shown on the upper side is of the light beam having no state signal superimposed thereon, for example, in the form of pulses flickering with a period of T1 and a lighting-up time of T3. The light beam having the state signal superimposed thereon is shown on the lower side in the same figure, for example, in the form of pulses which rise with a period of T1/2 in response to the ON state of switches, as will be described later, and thereupon the light source 21 is turned on. More specifically, referring to FIG. 10, light source 21 is kept off so long as switches S1, S4, S5 and S6 are in the OFF state and kept on so long as switches S2 and S3 are in the ON state. Before and after the pulses indicating the states of switches S1 through S6, a start pulse and a stop pulse are provided. Accordingly, an 8-bit signal will be necessary if six switches are used to indicate the state of pole 1.

FIG. 9 is a schematic circuit block diagram of the target 2 and the state detector 13a making a part of the position detector 4, in which each light source 21 of the target 2 comprising an LED is driven by an LED lighting circuit 21a so as to flicker. A counter synchro circuit 21b is connected to this LED lighting circuit 12a and an oscillator 21c is connected to a counter synchro circuit 21b adapted to output an LED lighting pattern, as shown by FIG. 10, and a parallel/serial converter 21d. A switch input circuit 21e is connected to the parallel/serial converter 21d so that ON-OFF signals of the respective switches S1 through S6 may be input to the switch input circuit 21e. Consequently, the light beam for target detection emitted from the light source 21 flickers in response to pulses corresponding to a combination of the LED lighting pattern and ON-OFF of the switches S1 through S6. These switches S1 through S6 are arranged, for example, so that the switch S1 is turned on when the ferrule 3a indicates a given position and the switch S2 is turned on when the ferrule 3b indicates a given position. Specifically, these ferrules 3a, 3b, respectively, contain therein pressure-sensitive switches adapted to sense a pressure generated as pole 1 is positioned with one of the ferrules 3a, 3b being fixed into the ground or road surface to be turned ON. The switch S3 is a readiness switch adapted to be manually turned ON by the operator holding pole 1 when the operator confirms that the pointed end of pole 1 indicates a given position. The switch S4 is a battery check switch adapted to be turned ON when a voltage of the battery drops below a predetermined level. The switches S5 and S6 are spare switches.

The light beam for target detection emitted from light source 21 is sensed by the light receiver 5 of the measuring head 11, the output signal from which is applied to the state detector 13a (FIGS. 7, 8 and 9) included in the control unit 13 serving to detect a state of pole 1 based on the state signal contained in the light beam for target detection emitted from the light source 21. Optical axis offset detector 13b also includes control unit 13 which detects whether the light beam for target detection emitted from the light source 21 is incident on the proper zone of the light receiver 5.

Referring to FIG. 9, a counter synchro circuit 5f is connected via an amplifier 5e to the respective photoconductive elements of light receiver 5. To this counter synchro circuit 5f there are connected an oscillator 5g and a serial/parallel converter 5h. To the serial/parallel converter 5h, in turn, there are connected a register 5i provided with memories associated with the switches S1 through S6. A latching clock pulse is applied from the counter synchro circuit 5f to the register 5i. Thus, data corresponding to ON-OFF of the switches S1 through S6 contained in the light beam for target detection emitted from the light source 21 are registered in the register 5i.

Referring to FIG. 9, the optical axis offset detector 13b, comprising a band-pass filter 41, a synchronous detector 42 and an A/D converter 43, is connected to the respective photoconductive elements of the light receiver 5. Outputs from the respective photoconductive elements of the light receiver 5 are converted by the band pass filter 41 and the synchronous detector 42 to voltages corresponding to quantities of light being incident on the respective photoconductive elements, then digitally converted by the A/D converted 43 and applied to the computer 15b serving as the position computing device.

A range finding light beam emitted from the range finding light emitting element 4a of the measuring head 11 is reflected by the reflector 22 of target 2 and then incident on a range finder 13c to determine a distance to target 2. This light wave range finder 13c is controlled by range finder control command signal 13e provided from the computer 15e and outputs, in turn, reflector range finding data 13d to the computer 15a. The measuring head 11 is supported by the vertically rotatable mechanism (elevation motor) 11a and the horizontally rotatable mechanism (azimuth motor) 11b, and these motors 11a, 11b are driven by angle command motor control signal 13f provided from the computer 15b. An elevation encoder 11d and an azimuth encoder 11c are connected to these motors 11a, 11b, respectively, so that angular positions of these motors 11a, 11b are detected by an angle readout counter 13g, connected to encoders 11c, 11d. Thus, these motors 11a, 11b encoders 11c, 11d and angle readout counter 13g constitute together the coordinate detector.

On the other hand, the photographing equipment 6 is controlled by camera control signal 13h provided from the computer 15e of the control unit 13. Television picture 13i output from the photographing equipment 6 is supplied, as shown by FIG. 8, to a computer 15d having a picture switching function and a still picture holding device 13m.

When output from the state detector 13a is measurable signal, a reflector position data 13j is calculated by the computer 15a based on the reflector range finding data 13d and the angle data output from the angle readout counter 13g. The reflector position data 13j thus obtained are used by a computer 15c serving as a processor and a plan view plotting mechanism to produce sketch data 13n. Outputs from the optical axis offset detector 13b and the angle readout counter 13g are processed by the computer 15b along with angular movement command signal 13k and output as the angle command motor control signal 13f. The television picture 13i is applied to the computer 15d and the still picture holding device 13m output of which is applied to the computer 15d. The sketch data 13n also is applied to the computer 15d and these inputs are applied via a computer 15f to the picture display 14. The computer 15f allows the picture display 14 to selectively compose the actual situation detected by the photographing equipment 6, the still picture held by the still picture holding device 13m and the sketch data 13n which are being produced or have been completed to display a composite picture.

The computer 15c produces the sketch data 13n under control of a plotting command signal 13o and the sketch data 13n are divided into accident data 13p and map data 13q, both of which are written by a disk drive 13r into a disk 13s serving as recorder. Plotting data previously stored in the disk 13s, e.g., letters, symbols, sketching frame 13t and plotting pattern 13u are provided from the disk drive 13r to the computer 15c.

An output signal from the mouse 16 is applied to a mouse driver 16a and a mouse cursor display signal 16b output from the mouse driver 16a is applied to the computer 15f, so as to be composed with another picture on the picture display device 14. The mouse cursor display signal 16b is applied, along with predetermined screen data 13y, for various commands output from the disk drive 13r, to the computer 15e, in which the screen data 13y are compared with the mouse cursor display signal 16b to produce various control signals 13x, which are, in turn, applied to relevant functions. The screen data 13y for various commands are applied to the computer 15f and displayed on the picture display 14 in order to be used by the mouse 16 for indication of various commands. Among the various control signals 13x, a sketch printing command signal 17a is applied to a plotter controller 17b which drives, in turn, the X-Y plotter 17.

Operation of the position measuring/plotting apparatus constructed according to the teachings of the invention, as has been described above, will be considered together with a manner in which a sketch of an actual site is made.

Referring to FIG. 1, the measuring head 11 is placed on an appropriate point of the actual site to be sketched. This means that the position detector 4 is also placed on this point, since the measuring head 11 is provided with the position detector 4. On the other hand, pole 1 carrying the targets 2 is fixed on the point of which the coordinates must be detected so that the light sources 21 and the reflector 22 of each target 2 are properly oriented to the measuring head 11. The mouse 16 is operated to adjust vertical and horizontal angles of the measuring head 11, with the angular movement command signal 13k to assure that the target 2 detected by the photographing equipment 6 incorporated in the measuring head 11 appears on the picture display 14.

When the photographing equipment 6 of the measuring head 11 detects the target 2 on the screen adjacent its center, the light beam for target detection emitted from light source 21 of target 2 is incident on the light receiver 5 for target detection of the position detector 4. Thereupon, one or more of the photoconductive elements 5a, 5b, 5c, 5d of the light receiver 5 are exposed to the light beam incident on the light receiver 5. The computer 15b, serving as the position computing device, performs operation of the previously mentioned equations (1) and (2) based on the output signal from the optical axis offset detector 13b and applies the angle command motor control signal 13f as a drive signal to the vertical rotatable mechanism 11a and horizontally rotatable mechanism 11b, in order to adjust the values K, L of the equations (1) and (2) below the predetermined values. Thus, the incident position on the light receiver 5 varies as the vertically rotatable mechanism 11a and the horizontally rotatable mechanism 11b are driven by the drive signal, since the optical axis of the position detector 4 is also moved thereby. Monitoring such variation by the position computing device, the position detector 4 may be appropriately rotated by the vertically rotatable mechanism 11a and the horizontally rotatable mechanism 11b until the light beam for target detection emitted from light source 21 are equally incident upon the respective photoconductive elements 5a, 5b, 5c, 5d and simultaneously the range finding light beam emitted from the range finding light emitting element 4a of the position detector 4 is reflected on the reflector 22 of the target 2 and incident upon the range finding light receiving element 4b to assure that the range finding light beam projected from the range finding light emitting element 4a toward the target 2 is detected by the range finding light receiving element 4b.

Referring to FIG. 10, the state signal used to identify a state of pole 1 is superimposed on the light beam for target detection, and therefore this state signal also is detected by the light receiver 5. Referring to FIG. 9, the state signal is stored in the register 5i after serial/parallel conversion so that a state of the target may be identified based on the ON-OFF state of the register 5i. For example, the state signal shown in FIG. 10 represents a state in which switches R2 and R3 are turned ON, as shown in FIG. 9. When switch R2 is ON it corresponds to the state in which the ferrule 3b of pole 1 is properly indicating a given position, while ON for switch R3 corresponds to the state in which the operation of measuring is ready. Upon confirming the signal "switch R3 is ON," measuring of a distance to the target 2 is started, and simultaneously the elevation angle and azimuth angle of the position detector 4 are input from the angle readout counter 13g to the computer 15b.

As is known, for light wave range finding, a linear distance from the position detector 4 to the target 2 can be measured so long as the range finding light beam emitted from the range finding light emitting element 4a is properly detected by the range finding light receiving element 4b. Rotation given by the vertically rotatable mechanism 11a determines an angle of elevation, or depression, of the position detector 4 relative to the target 2 in a vertical plane, while rotation of the horizontally rotatable mechanism 11b determines an angle of runout (azimuthal angle) of the position detector 4 relative to the target 2 in a horizontal plane. In this way, spatial coordinates (three dimensional coordinates) of the target 2 can be calculated from the linear distance, the angle of elevation, or depression, and the angle of runout.

Figure 11:
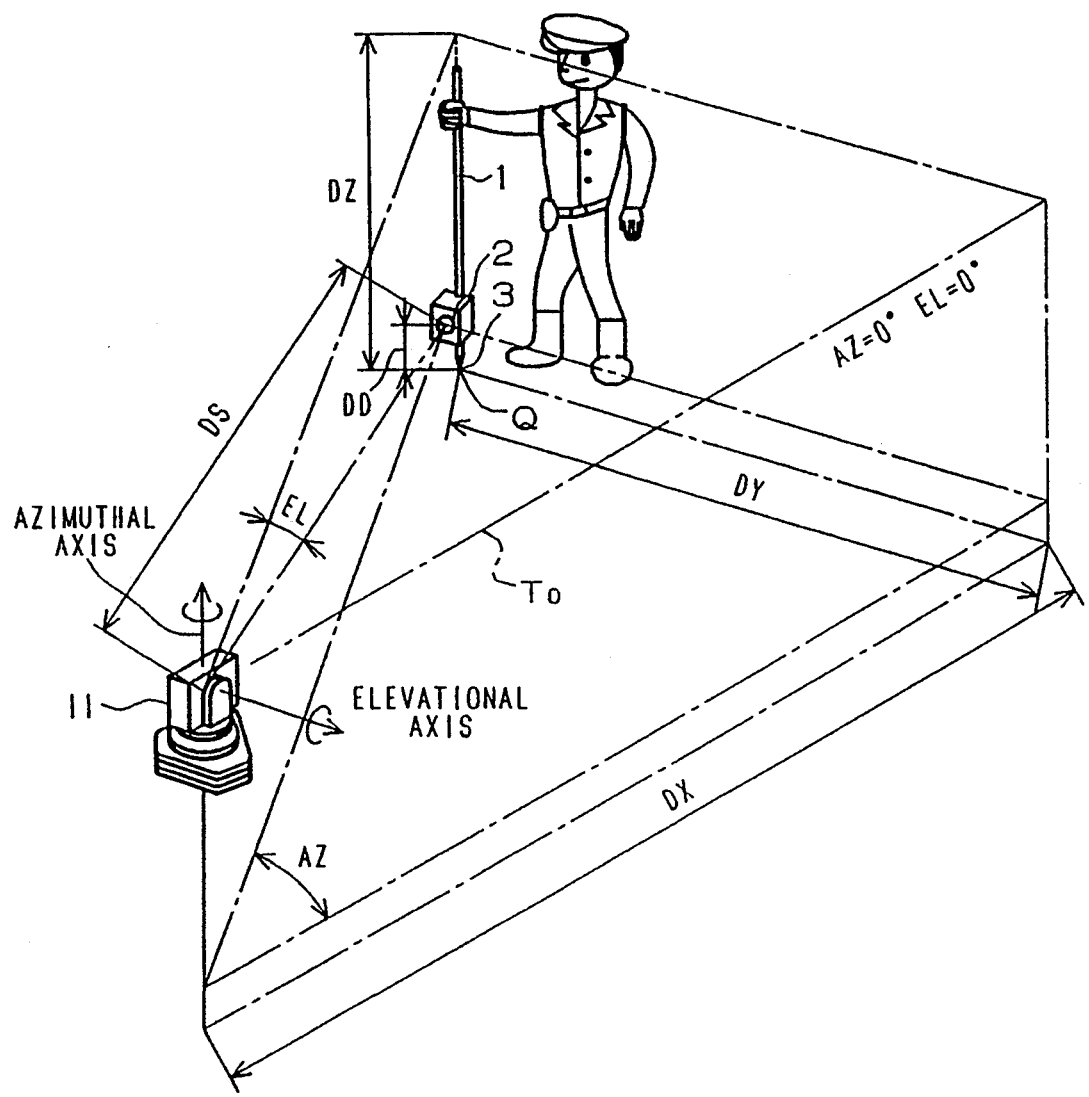
FIG. 11 is a schematic perspective view illustrating a manner in which an indicated position to be measured is calculated.

Calculation of the spatial coordinates of the target 2 will be described with reference to FIG. 11. The ferrule 3 of pole 1 is fixed into the ground, or road surface, at a position Q to be measured. It is assumed here that the measuring head 11 has its measuring reference point defined by XYZ coordinates (0, 0, 0) and the position Q to be measured is defined by coordinates (DX, DY, DZ). It is further assumed that the measuring head 11 has its zero-optical axis $T_o$ oriented in the direction of the X-axis, the vertically rotatable mechanism 11a of the measuring head 11 has its rotational axis (elevation axis) oriented in direction of the Y-axis, and the horizontally rotatable mechanism 11b has its rotatable axis (azimuth axis) oriented in the direction of the Z-axis. Additionally, it is assumed that a distance DS to the target 2 was obtained with the position detector 4 of the measuring head 11 aimed at target 2, the azimuth axis rotated by an angle of AZ°, and the elevation axis rotated by an angle of EL°. The spatial coordinates of the position Q to be measured can be calculated as follows:

$$DX = DS * \cos(EL) * \cos(AZ) \qquad (3)$$

$$DY = DS * \cos(EL) * \sin(AZ) \qquad (4)$$

$$DZ = DS * \sin(EL) - DD \qquad (5)$$

where DD represents a distance from the target 2 to the ferrule 3, and is known. When the target 2 lies on the zero-optical axis $T_o$, AZ=0°, EL=0° and therefore DX=DS, DY=0, DZ=−DD.

Figure 12:
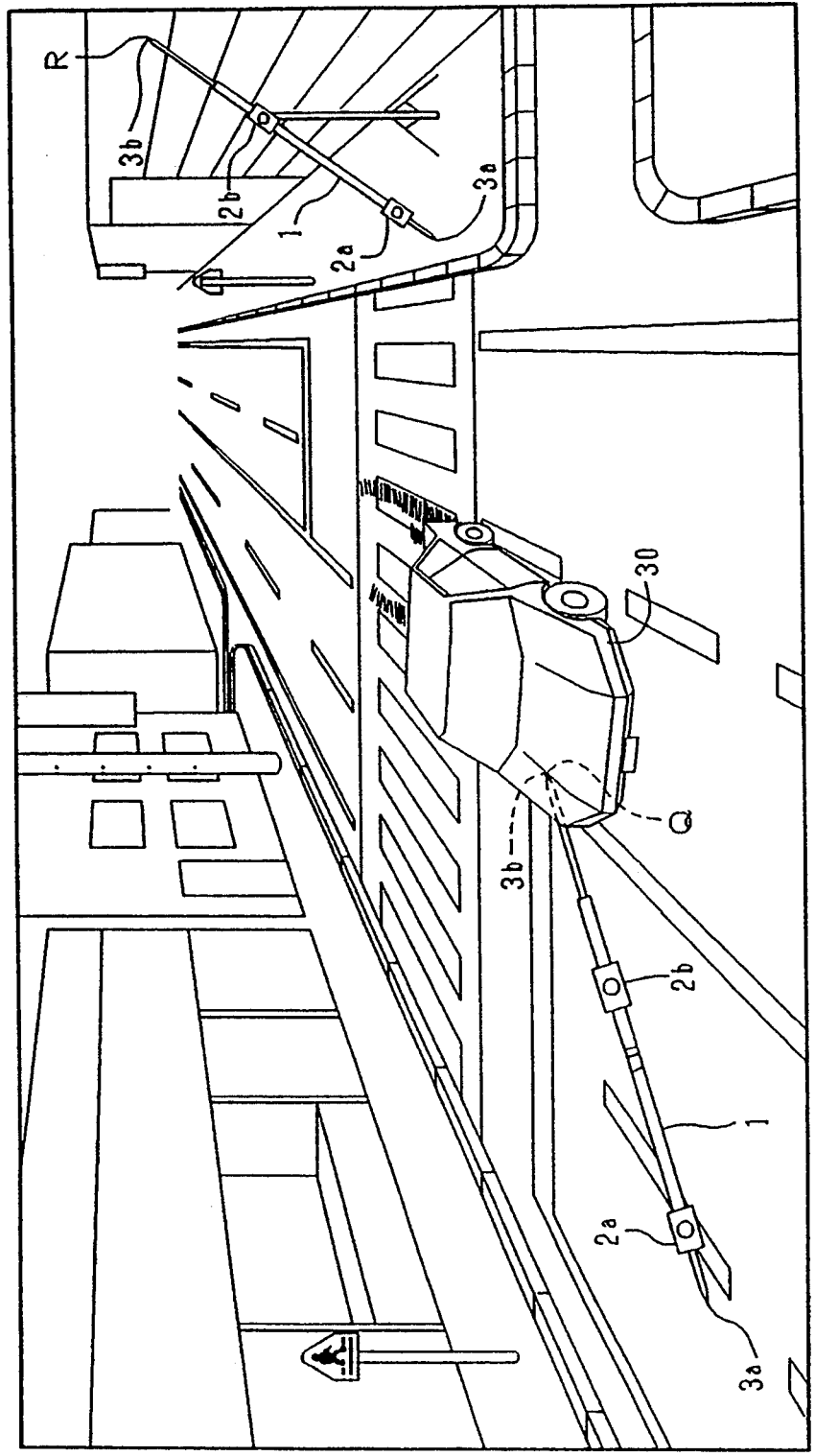
FIG. 12 is an illustration of the actual accident site, in which the position indicator is utilized in various manners.

FIG. 12 shows the actual site situation detected by the photographing equipment 6, in which the position Q to be measured lies under the victim car 30, and consequently the measuring head 11 provided with the photographing equipment 6 cannot directly detect the position Q or the position Q to be measured lies across the victim car 30, and cannot be detected by the measuring head 11 with pole 1 being oriented vertically. In such situation, pole 1 may be tilted to assure that both the targets 2a, 2b are not obstructed by victim car 30.

For each position Q to be measured, the operation of measuring is performed with respect to the pair of targets 2a, 2b. For example, when pole 1 is held with its ferrule 3a fixed into the road surface, target 2a lies at the upper level while the target 2b lies at the lower level along pole 1. When ferrule 3a indicates a given position to be measured, the previously mentioned switch S1, adapted to identify a state of the target 2, is turned ON. The ferrule 3a lies on the straight line connecting the targets 2a, 2b and, therefore, the spatial coordinates of the ferrule 3a, i.e., the position Q to be measured, can be calculated from the spatial coordinates of two targets 2a, 2b. The spatial coordinates of the position Q may be projected onto a horizontal plane to obtain the corresponding plane coordinates. Furthermore, by previously adjusting the modulation frequencies of these two targets 2a, 2b to different values, it can be readily determined whether the calculated spatial coordinates are based on the data from the target 2a or the target 2b, without erroneous calculation of the spatial coordinates defining the position to be measured.

In this manner, even when pole 1 is held in a tilted posture, the spatial coordinates of ferrule 3b, and therefore of the position Q to be measured, can be calculated from the spatial coordinates of the targets 2a, 2b, since the ferrule 3b lies on the line connecting targets 2a, 2b. The pressure-sensitive switch S2 responds to depression of ferrule 3b against the position Q to provide the state signal representing that ferrule 3b indicates the position Q to be measured. It should be understood that the distance on pole 1 from ferrule 3b to the second target 2b is longer than the distance from the ferrule 3a to the second target 2b, which is used, and the position Q to be measured is indicated by the ferrule 3b. When the position to be measured lies at a relatively high level as a position R in FIG. 12, it is impossible to place the target at said position R but said position R can be measured by indicating said position R by the ferrule 3b in a manner as shown in FIG. 12. In this case, ferrule 3b is pressed against the position R to turn the switch S2 ON.

For the case of utilizing ferrule 3b to indicate the position being measured, assume that the distance from said ferrule 3b to the target 2a is twice the distance from the ferrule 3b to the target 2b, the targets 2a, 2b are defined by spatial coordinates (Xa, Ya, Za) and (Xb, Yb, Zb), respectively, and the position to be measured is defined by spatial coordinates (X, Y, Z):

$$(X + Xa)/2 = Xb \qquad (6)$$

$$(Y + Ya)/2 = Yb \qquad (7)$$

$$(Z + Za)/2 = Zb \qquad (8)$$

and from these equations (6), (7) and (8), the spatial coordinates (X, Y, Z) of the position to be measured are given as follows:

$$X = 2*Xb - Xa \quad (9)$$

$$Y = 2*Yb - Ya \quad (10)$$

$$Z = 2*Zb - Za \quad (11)$$

So far as the target $2b$ is interposed between the ferrule $3b$ and the target $2a$ and the position to be measured is indicated by said ferrule $3b$, the position to be measured can always be calculated by the above-mentioned equations (9), (10) and (11). It will be recognized that it is also possible to calculate said position being measured by modifying said equations even when the target $2b$ is not interposed between the ferrule $3b$ and the target $2a$.

Referring to FIGS. 2 and 12, the targets $2a$, $2b$ may be positioned toward one end of pole 1, for example, toward the ferrule $3a$, for an obstacle having a height smaller than that of victim car 30 to achieve desired operation of measuring. Specifically, both targets $2a$, $2b$ will be positioned higher than the upper end of the obstacle when the pole is vertically oriented on the road surface and it becomes unnecessary to tilt pole 1.

Figure 22:
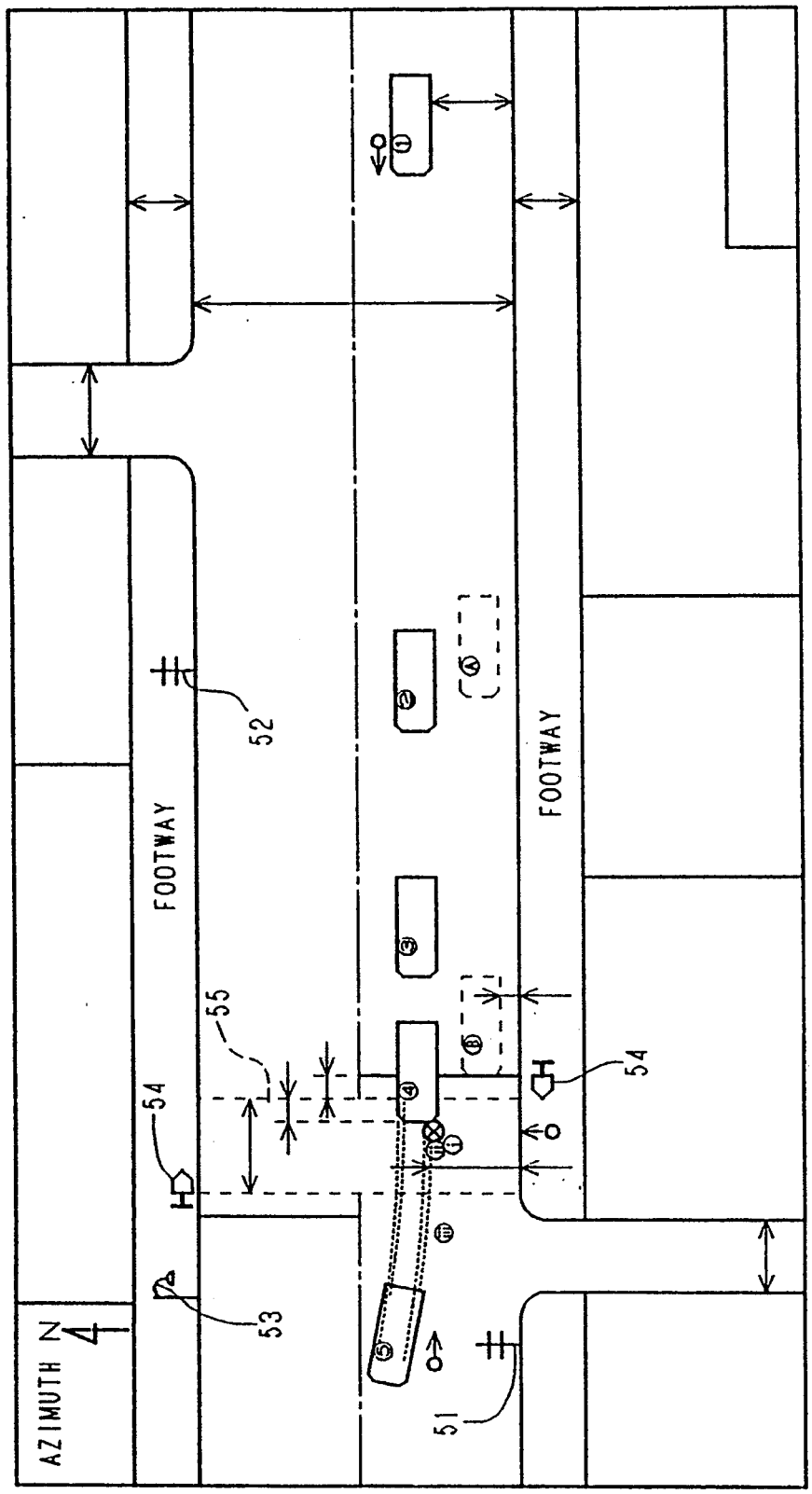
FIG. 22 is an exemplary sketch of the actual site made by the position measuring/plotting apparatus of the invention.

Referring again to FIG. 1, relevant scene components to be measured, such as utility poles 51, 52, a street lamp 53, a road sign 54, and a pedestrian crossing 55, are respectively indicated by pole 1 and spatial coordinates of target 2 are calculated for each component. The spatial coordinates defining these relevant scene components are respectively projected onto the horizontal plane, and a sketch of the actual site, as shown by FIG. 22, is plotted from these plane coordinates. Plotting of the actual site sketch may be performed while it is displayed on said picture display device 14 and then printed by the X-Y plotter 17.

Figure 13:
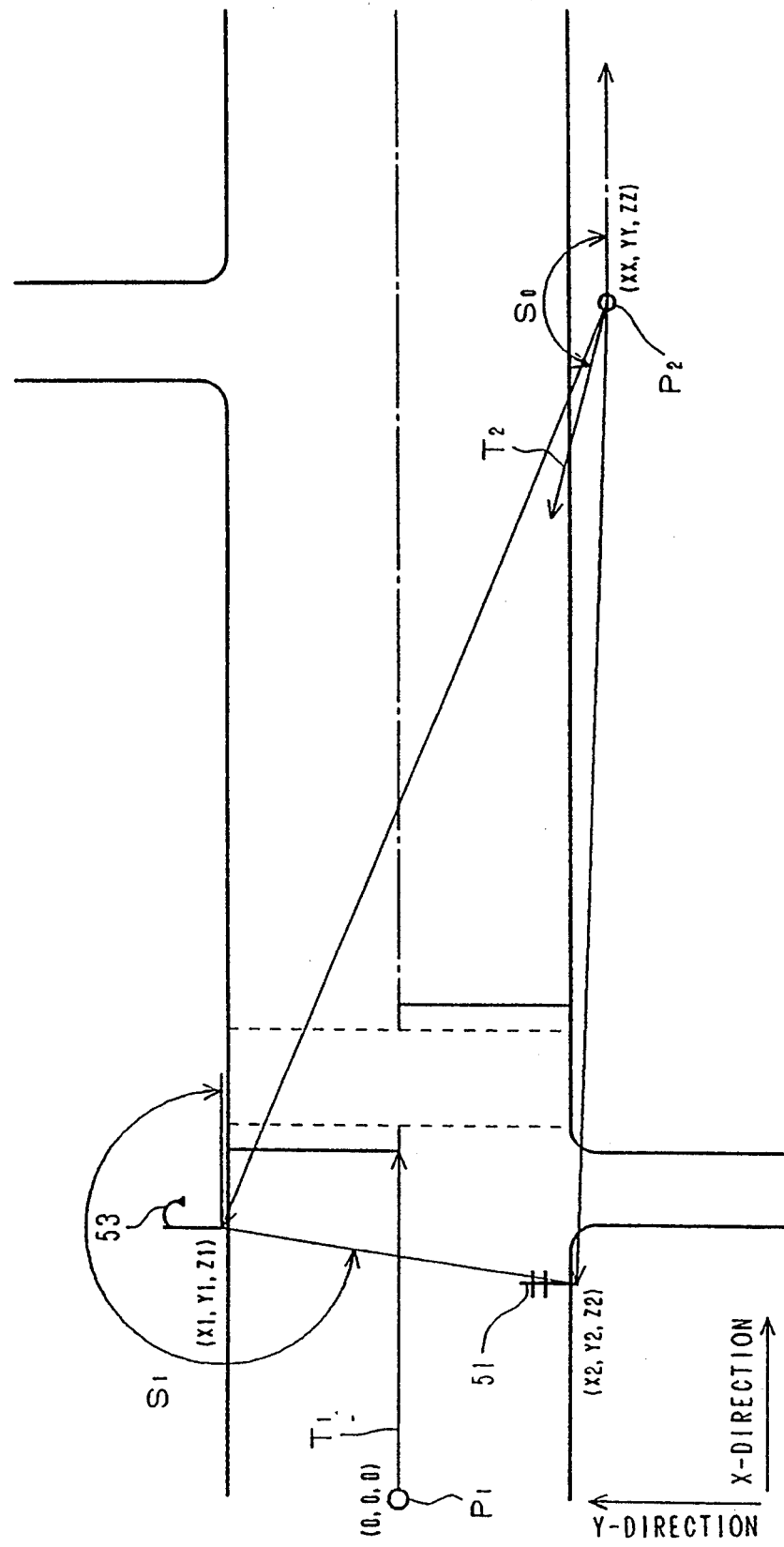
FIG. 13 is a schematic plan view of a traffic accident site plotted by the position measuring/plotting apparatus with the position indicator set up at two different points.
Figure 20:
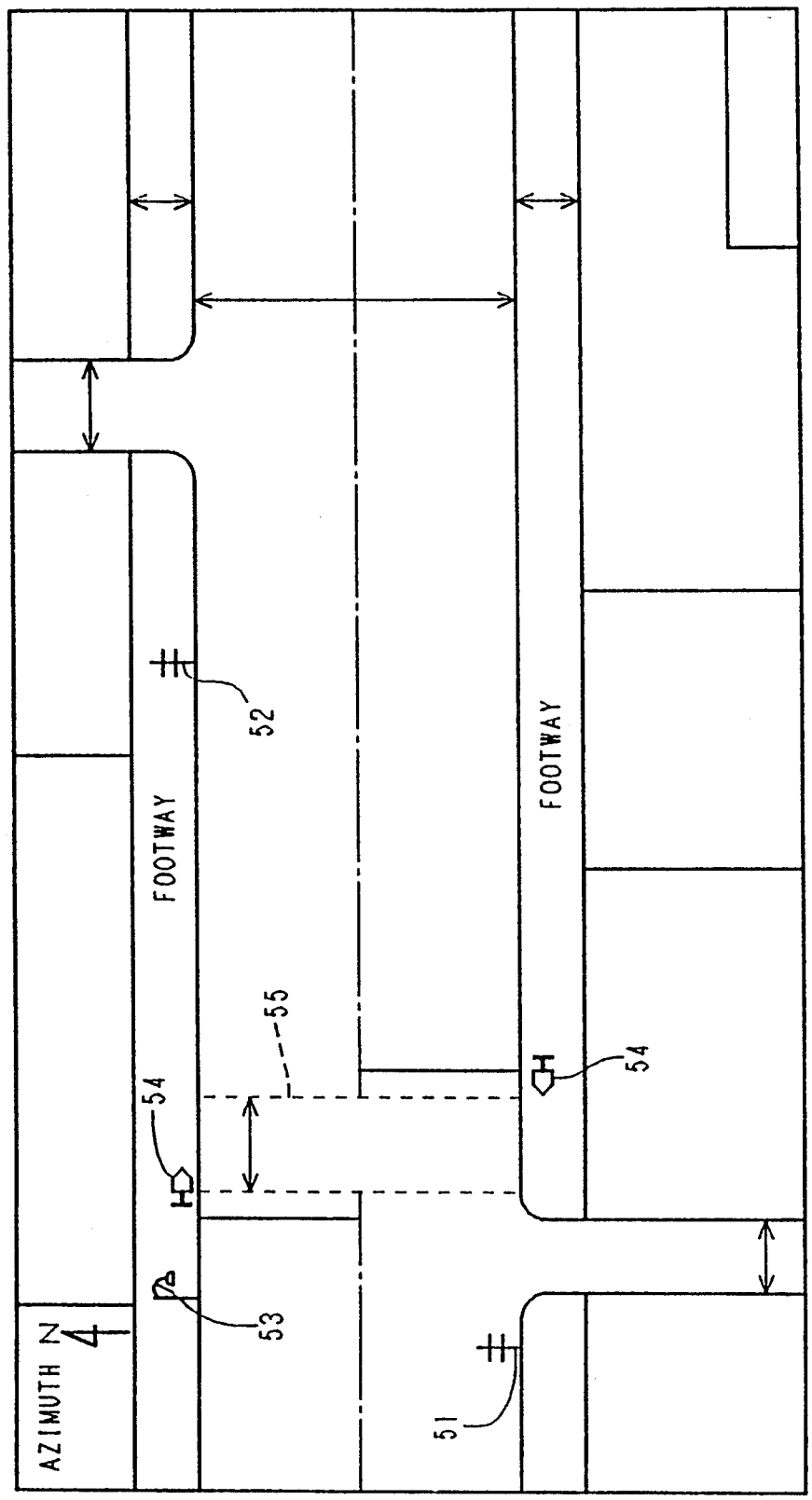
FIG. 20 is a plan view showing immovable components in a sketch of an actual traffic accident site.
Figure 21:
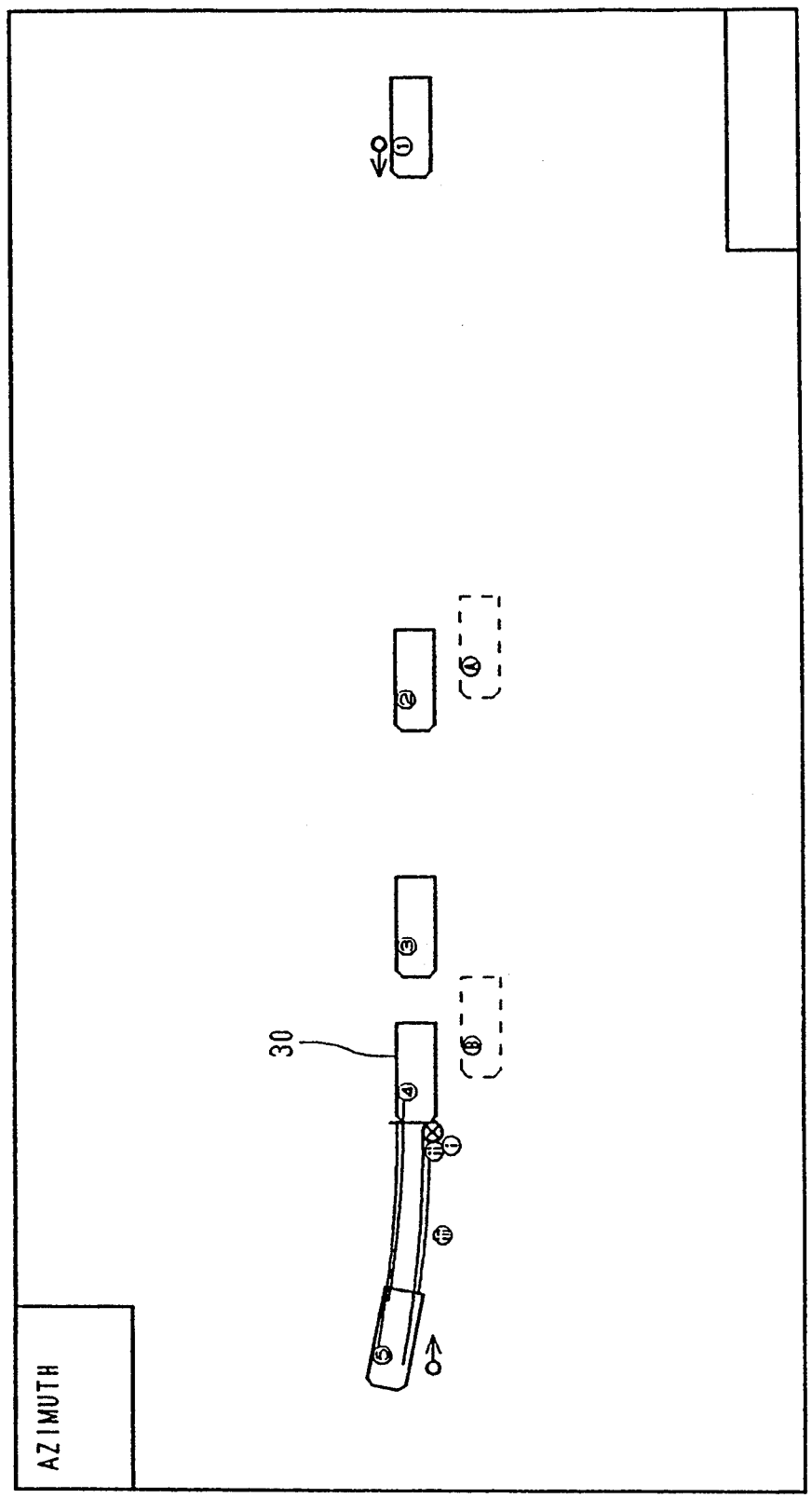
FIG. 21 is a plan view showing movable components in the sketch of an actual traffic accident site.

A procedure to superimpose newly obtained data for an actual site of a traffic accident on data previously obtained for an earlier traffic accident at the same site, to thereby plot a sketch of the actual site, will be described with reference to FIGS. 13-17. Depending on the site of the traffic accident, it may be impossible to measure the entire site with the measuring head 11 fixed on a single point and, in this case, it is sometimes required to move said measuring head 11 from one point to another point, or to fix a plurality of measuring heads 11 at predetermined points, so that the data is obtained from the respective points and then superimposed on one another. If the map data of the accident that happened in the past is useful, and the accident data regarding a new accident may be superimposed on said map data to achieve a desired plotting, the time taken for measuring and plotting can be substantially reduced. Depending on the particular site of the traffic accident, the measuring head 11 should be placed first on a point $P_1$ (for the first measurement) and then moved to another point $P_2$ (for the second measurement), as shown by FIG. 13. However, the data on the movable scene components, such as the victim car(s) as shown by FIG. 21, can be effectively superimposed on the existing data for the immovable scene components of the actual accident scene, such as the configuration of the roads, as shown by FIG. 20. In the former case, the data obtained at the respective points $P_1$, $P_2$ must be superimposed on one another to plot a desired sketch of the actual scene.

Figure 18:
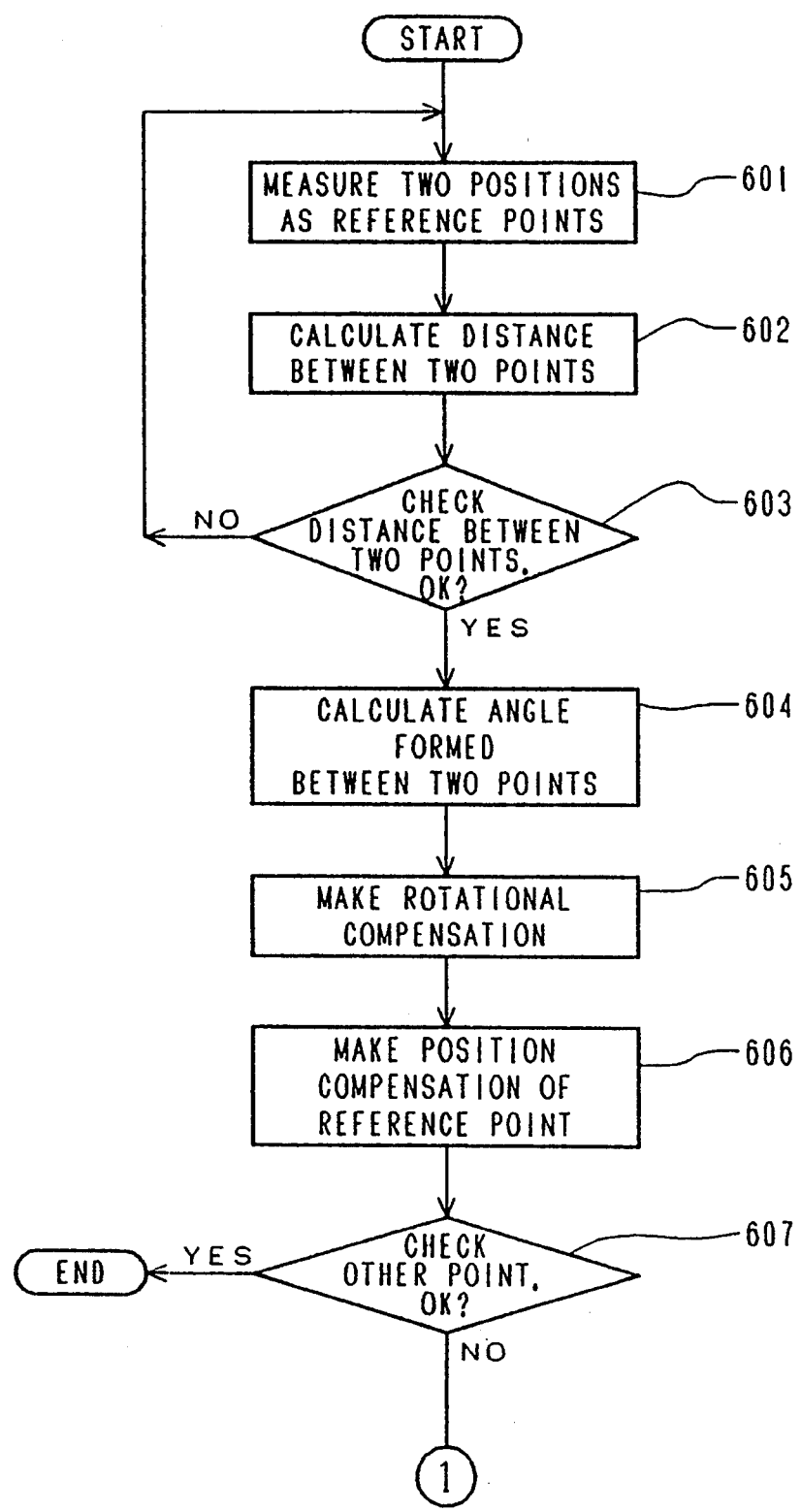
FIG. 18 is a flow chart showing a procedure to combine results obtained from two different measuring points with each other.

First of all, two appropriate components are selected as reference points, for example, the street lamp 53 and the utility pole 51, illustrated in FIGS. 13 and 20. The first measurement from point $P_1$ provides the coordinate data of $P_1$ (0, 0, 0), the street lamp 53 (X1, Y1, Z1) and the utility pole 51 (X2, Y2, Z2). When the second measurement is performed from a point with the zero-optical axis $T_2$, coordinates of $P_2$ (XX, YY, ZZ) and an angle $S_0$ defined between $T_1$ and $T_2$ may be determined. In the operation of measuring, as illustrated by FIG. 11, the second measurement performed in the reference direction $T_2$ from the point $P_2$ (0, 0, 0) provides the coordinates of the street lamp 51 (XA(1), YA(1)) and the coordinates of the utility pole 53 (XB(1), YB(1), ZB(1)). A step 601 in FIG. 18 corresponds this measurement, and a step 602 calculates distances L1 and L2 between two points during first and second measurements, respectively, followed by a step 603 in which a determination is made.

$$L1 = \{(X2-X1)^2 + (Y2-Y1)^2 + (Z2-Z1)^2\}^{\frac{1}{2}} \quad (12)$$

$$L2 = \{(XB(1)-XA(1))^2 + (YB(1)-YA(1))^2 + (ZB(1)-ZA(1))^2\}^{\frac{1}{2}} \quad (13)$$

These steps 601-603 are to confirm that the same point was measured at the first measurement and the second measurement, and to do this, it is determined whether a difference between L1 and L2 falls within an acceptable range or not. If the difference does not fall within the acceptable range, the procedure returns to step 601, and the measurement is repeated until a coincidence is determined.

If step 603 confirms that the same point was measured at the first measurement and the second measurement, the procedure proceeds to step 604 where the angle $S_0$ formed between the zero-optical axes $T_1$ and $T_2$ during the first measurement and the second measurement, respectively, is calculated according to equations (14), (15) and (16). Furthermore, an angle $S_1$ formed between $T_2$ of the first measurement and a straight line connecting street lamp 53 and utility pole 51 as follows:

$$S_1 = \tan^{-1}\{(Y2-Y1)/(X2-X1)\} \quad (14)$$

Then, an angle $S_2$ formed between $T_2$ of the second measurement and a straight line connecting the street lamp 53 and utility pole 51 is calculated according to equation (15) as follows:

$$S_2 = \tan^{-1}\{(YB(1)-YA(1))/(XB(1)-XA(1))\} \quad (15)$$

Figure 15A:
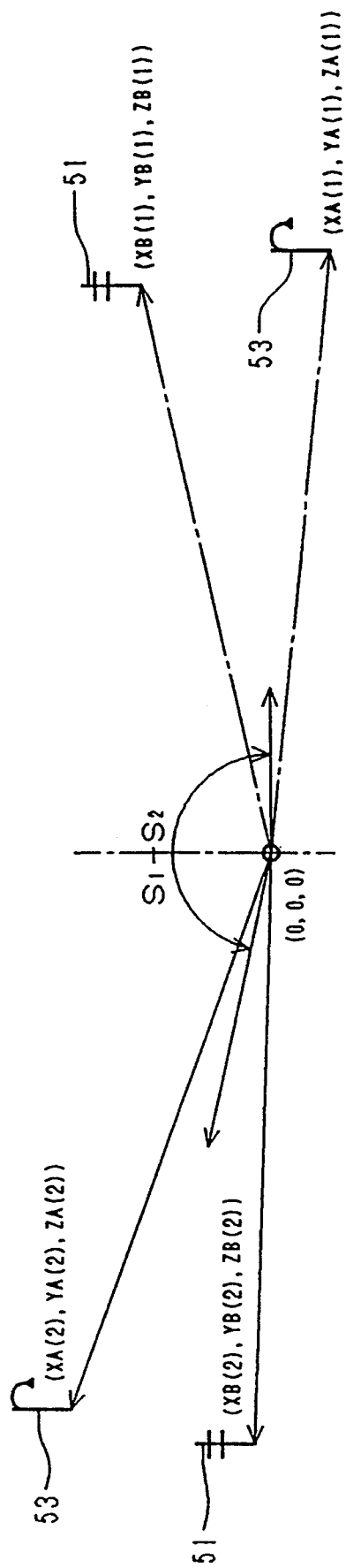
FIG. 15(a) is a diagram illustrating details of processing shown by the flow chart in FIG. 18.

Thereafter an angle $S_0$ (FIG. 15(a)) formed between the zero-optical axes $T_1$ and $T_2$ is calculated based on $S_1$ and $S_2$ as follows:

$$S_0 = (S_1 - S_2) \quad (16)$$

Figure 14A:
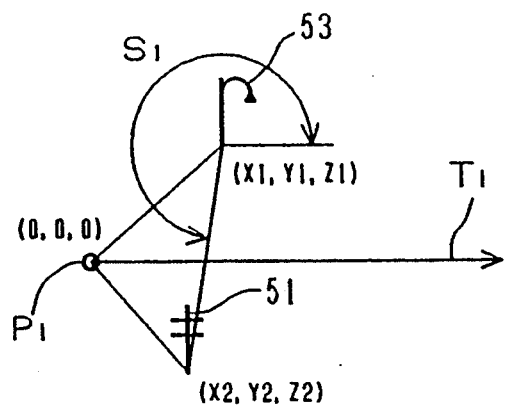
FIG. 14(a) is a diagram from reference point P1 illustrating details of processing shown by a flow chart in FIG. 18.
Figure 14B:
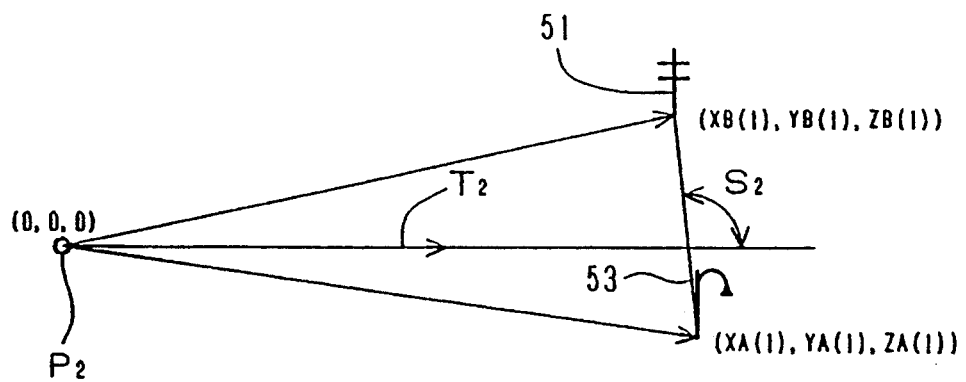
FIG. 14(b) is a diagram from reference point P2 illustrating details of processing shown by flow chart in FIG. 18.

Steps 605 and 606 calculate coordinates (XX, YY, ZZ) of $P_2$ based on the angle $S_0$ calculated in previous step 604. Referring to FIG. 14(a), the street lamp 53 and the utility pole 51 are rotated around $P_1$ (FIG. 14a) to bring the value obtained by the second measurement in coincidence with the value obtained by the first measurement. The street lamp 53 and utility pole 51 have coordinates (XA(2), YA(2), ZA(2)) and (XB(2), YB(2), ZB(2)), respectively, after rotation, wherein:

$$XA(2) = XA(1) * \cos(S_0) - YA(1) * \sin(S_0) \quad (17)$$

$$YA(2) = XA(1) * \sin(S_0) + YA(1) * \cos(S_0) \quad (18)$$

$$ZA(2) = ZA(1) \tag{19}$$

$$XB(2) = XB(1)^* \cos(S_0) - YB(1)^* \sin(S_0) \tag{20}$$

$$YB(2) = XB(1)^* \sin(S_0) - YB(1)^* \cos(S_0) \tag{21}$$

$$ZB(2) = ZB(1) \tag{22}$$

Figure 15B:
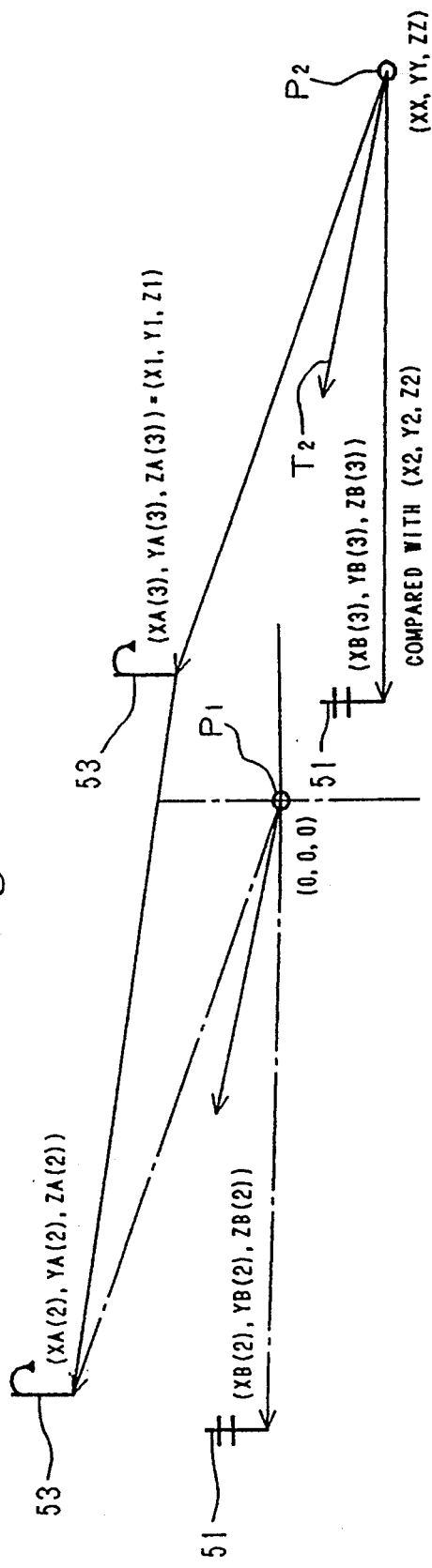
FIG. 15b is a diagram illustrating details of processing shown by flow chart in FIG. 18.

The coordinates of street lamp 53, which are rotation-compensated in step 605, are moved until they coincide with the coordinates of the street lamp 53, having been measured from $P_1$ (step 606). This amount of movement indicates the position of $P_2$ (FIG. 14b) on the first coordinates (XX, YY, ZZ). Such movement is illustrated by FIG. 15(b).

$$XX = X1 - XA(1) \tag{23}$$

$$YY = Y1 - YA(1) \tag{24}$$

$$ZZ = Z1 = ZA(1) \tag{25}$$

The coordinates of the utility pole 51 (XB(3), YB(3), ZB(3)) after movement are given by the following equations:

$$XB(3) = XB(2) - XA(2) + X1 = XB(2) + XX \tag{26}$$

$$YB(3) = YB(2) - YA(2) + Y1 = YB(2) + YY \tag{27}$$

$$ZB(3) = ZB(2) - ZA(2) + Z1 = ZB(2) + ZZ \tag{28}$$

The coordinates of utility pole 51 calculated in step 606 should coincide with the coordinates (X2, Y2, Z2) thereof having been calculated by the first measurement (often accompanied with a certain measurement error). A step 607 checks this coincidence.

$$XB(3) - X2 < \text{acceptable range} \tag{29}$$

$$YB(3) - Y2 < \text{acceptable range} \tag{30}$$

$$ZB(3) - Z2 < \text{acceptable range} \tag{31}$$

If the coordinates are determined in step 607 to be within the acceptable range in X−, Y− and Z− directions, the transformation is completed and the coordinates (XN(1), YN(1) ZN(1)) of the components that were measured along the zero-optical axis $T_2$ from the point $P_2$ are transformed on the coordinates obtained by the first measurement as follows (it is assumed that the coordinates after transformation are (XN(3), YN(3) and ZN(3))):

For the rotation compensation, $$XN(2) = XN(1)^* \cos(S_0) - YN(1)^* \sin(S_0) \tag{32}$$

$$YN(2) = XN(1)^* \sin(S_0) + YN(1)^* \cos(S_0) \tag{33}$$

$$ZN(2) = ZN(1) \tag{34}$$

For the movement compensation.

$$XN(3) = XN(2) + XX \tag{35}$$

$$YN(3) = YN(2) + YY \tag{36}$$

$$ZN(3) = ZN(2) + ZZ \tag{37}$$

Figure 16:
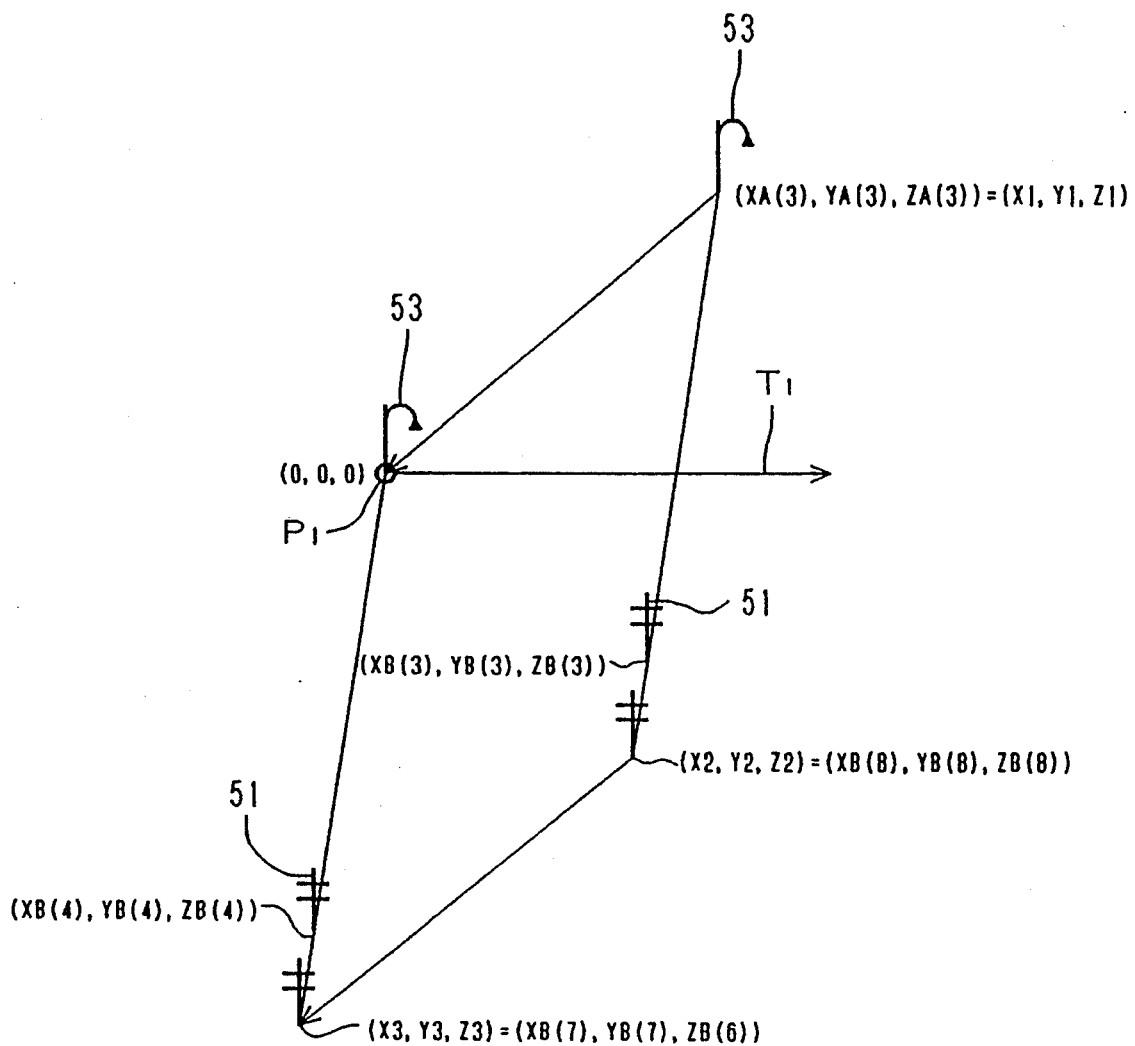
FIG. 16 is a diagram illustrating details of processing shown by a flow chart in FIG. 19.
Figure 19:
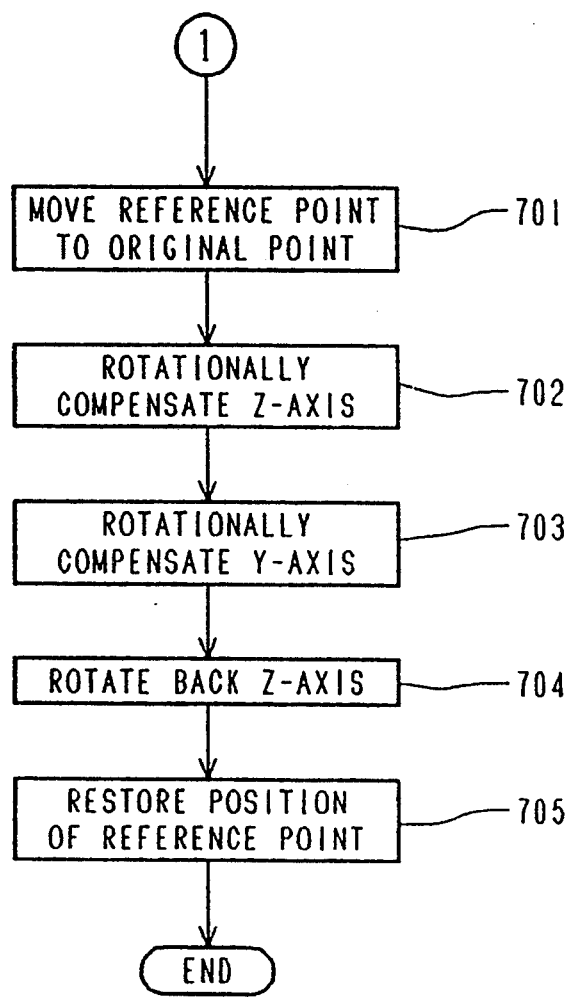
FIG. 19 is a flow chart showing a procedure to combine results obtained from two different measuring points with each other.

Theoretically, a certain measurement error in the Z-direction can be suppressed within the acceptable range confirmed by step 606 if horizontal adjustment of the measuring head 11 relative to the ground is made carefully in the first and second measurements, so as to maintain a desired measurement accuracy. However, such horizontal adjustment is very difficult in practice and, therefore, it is more practical to compensate for any such error in measurement by suitable computational techniques. Such computational compensation is illustrated by FIGS. 16, 17 and 19. It is assumed that, as a result of the coordinate transformation performed in steps 601-606, the coordinates of utility pole 51 were transformed to (XB(3), YB(3), ZB(3)) containing an error with respect to the first measurement data.

Referring to FIG. 16, a step 701 (FIG. 19) parallel moves the street lamp 53 (FIG. 16) to the point $P_1$. Assumed that the first measurement data coordinates of utility pole 51 are (X3, Y3, X3) and the second measurement data coordinates of the same are (XB(4), YB(4), ZB(4)), the first measurement data coordinates are given by:

$$X3 = X2 - X1 \tag{38}$$

$$Y3 = Y2 - Y1 \tag{39}$$

$$Z3 = Z2 - Z1 \tag{40}$$

and the second measurement data coordinates are given by:

$$XB(4) = XB(3) - X1 \tag{41}$$

$$YB(4) = YB(3) - Y1 \tag{42}$$

$$ZB(4) = ZB(3) - Z1 \tag{43}$$

Figure 17A:
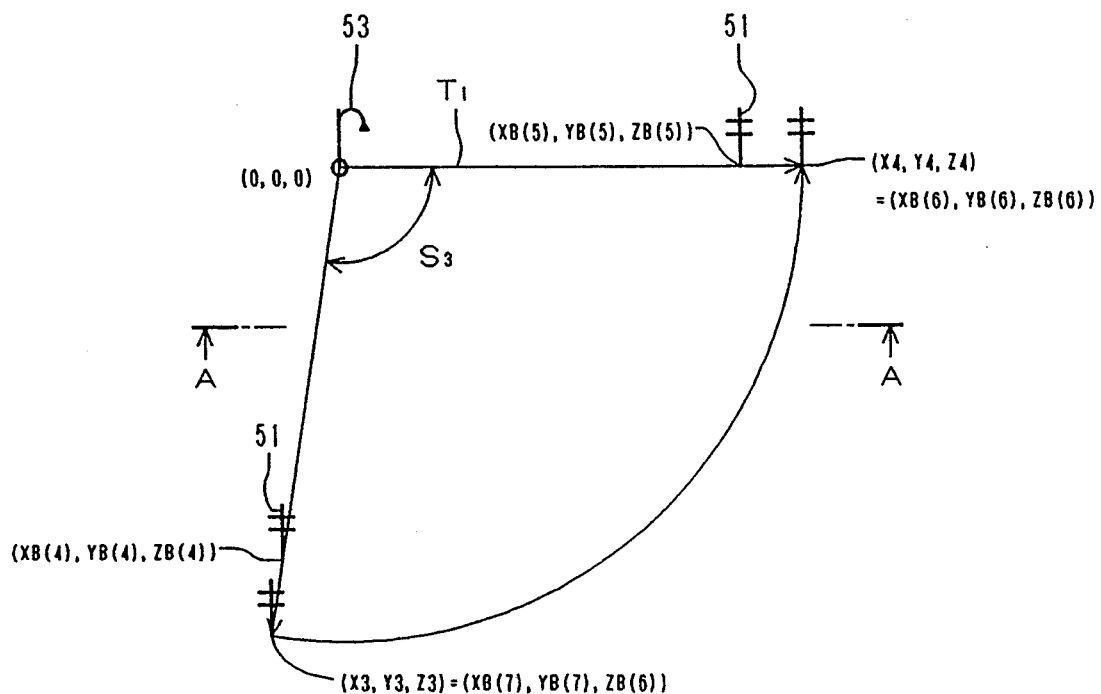

Referring to FIG. 17(a), a step 702 (FIG. 19) rotates the coordinates of utility pole 51 (FIG. 17(a)) by an amount of $S_3$ so that the Y-direction component is eliminated. Assumed that, after this rotation, the first measurement data coordinates are (X4, Y4, Z4) and the second measurement data coordinates are (XB(5), YB(5), ZB(5)), $$S_3 = \tan^{-1}(YB(4)/XB(4)) \tag{44}$$

The first measurement data coordinates are given by:

$$X4 = X3^* \cos(S_3) - Y3^* \sin(S_3) \tag{45}$$

$$Y4 = X3^* \sin(S_3) + Y3^* \cos(S_3) \tag{46}$$

$$Z4 = Z3 \tag{47}$$

and the second measurement data coordinates are given by:

$$XB(5) = XB(4)^* \cos(S_3) - YB(4) * \sin(S_3) \tag{48}$$

$$YB(5) = XB(4)^* \sin(S_3) + YB(4) * \cos(S_3) \tag{49}$$

$$ZB(5) = ZB(4) \tag{50}$$

Figure 17B:
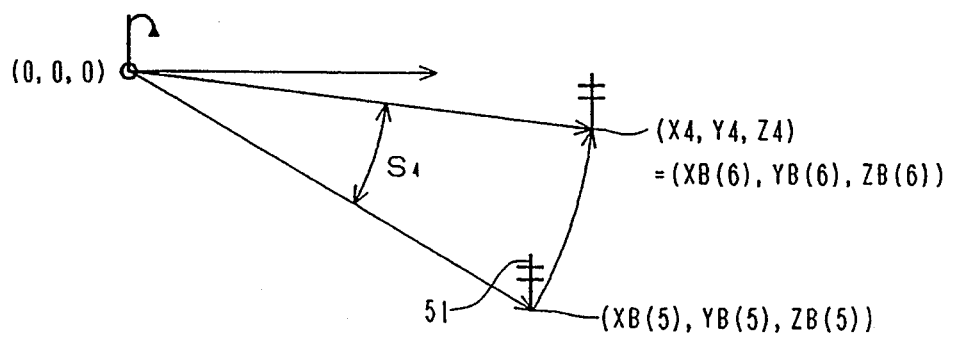

FIG. 17(b) is a diagram corresponding to the diagram (a) as viewed in the direction of arrows A—A (Z-axis is perpendicular to the plane of drawing), and this diagram shows an amount of offset $S_4$ somewhat exaggeratedly. The values obtained by the second measurement may be rotated by this offset angle $S_4$ to orient the values obtained by the second measurement in coincidence with the values obtained by the first measurement (step 703 FIG. 19). It is assumed that the second measurement coordinates after this rotation are (XB(6), YB(6), ZB(6)), $$S_4 = \tan^{-1}(Z4/X4) - \tan^{-1}(ZB(5)/XB(5)) \tag{51}$$

and the second measurement coordinates are given by:

$$XB(6) = XB(5) * \cos(S_4) - ZB(5) * \sin(S_4) \tag{52}$$

$$YB(6) = YB(5) \tag{53}$$

$$ZB(6) = XB(5) * \sin(S_4) + ZB(5) * \cos(S_4) \tag{54}$$

To restore the initial coordinates (X2, Y2, Z2) of utility pole 51, the coordinates obtained from first and second measurements and brought in coincidence one with the other coordinates may be rotated back by the angles of $S_3$ and $S_4$ by which the coordinates were rotated, as shown by FIGS. 17(a) and (b), respectively, in order to calculate an amount of angular offset and simultaneously may be moved back by the amount of movement by which the coordinates were moved to the point $P_1$, as shown by FIG. 16. Final coordinates of utility pole 51 are (XB(8), YB(8), ZB(8)) that are coincident with the data (X2, Y2, Z2) obtained by the first measurement (steps 704, 705 FIG. 19). These coordinates are given by the following equations:

$$XB(7) = XB(6) * \cos(-S_3) - YB(6) * \sin(-S_3) \tag{55}$$

$$YB(7) = XB(6) * \sin(-S_3) + YB(6) * \cos(-S_3) \tag{56}$$

$$ZB(7) = ZB(6) \tag{57}$$

$$XB(8) = XB(7) + X1 \tag{58}$$

$$YB(8) = YB(7) + Y1 \tag{59}$$

$$ZB(8) = ZB(7) + Z1 \tag{60}$$

While the invention has been described with the embodiment adopting pole 1 having two targets 2a, 2b fixedly mounted thereon, it is also possible with pole 1 having a single target 2 fixedly mounted thereon to achieve a desired measurement so far as the pole is vertically erected in its use or the single target 2 is adapted to be selectively mounted on the pole at one of two predetermined levels.

While the method to superimpose the state signal on the light beam for target detection emitted from the target 2 has been described with respect to the case in which the state signal is superimposed on each portion of the light beam corresponding to its one-half period, any other method may be effectively adopted, e.g., a period at which the light beams for target detection is emitted may be utilized to identify a state of the target.

Effect of the Invention

As will be apparent from the foregoing description, the position indicator used with the position measuring/plotting apparatus of the invention comprises a supporting rod indicating with its pointed end a position to be measured and a plurality of targets spaced one from another and fixedly mounted on the supporting rod so that these targets and the pointed end used to indicate the position being measured lie in a straight line. Distances from the pointed end to the respective targets are known and therefore spatial coordinates of the pointed end, i.e., of the position to be measured, can be calculated by calculating spatial coordinates of these targets. The coordinates thus calculated may be projected into the horizontal plane to plot a desired sketch of an actual site. By calculating the coordinates of the position to be measured based on the position coordinates of paired targets, the spatial coordinates of the position to be measured can be reliably obtained even when the supporting rod used to indicate the position is held in a tilted posture.

Even when the position to be measured is blocked by an obstacle, it is possible to measure this position because the supporting rod can be effectively used even in its tilted posture.

In addition, the targets are reliably detected by the position detector serving to measure the position, and accordingly said state signal can be reliably detected by said position detector without requiring separate provision of means to orient the position detector toward the targets and consequently increasing the number of parts.

With the position measuring/plotting apparatus of the invention, the state signal used to identify a state of the supporting rod is superimposed on the light beam emitted from each target, by which the position detector detects the target so that the position detector can detect not only the light beam emitted from the target but also the state signal indicating a state of the supporting rod. In this manner, the position detector can determine whether the supporting rod is ready for the operation of measuring or not, or how oriented the line connecting the two targets is.

Accordingly, the operator controlling the position measuring/plotting apparatus proper and the operator holding the supporting rod need not communicate with each other, utilizing transceivers, or the like. Consequently, time and labor savings are achieved.

According to the invention, the second coordinates acquired by the position measuring/plotting apparatus placed on the second measurement point are superimposed on the first coordinates acquired by the position measuring/plotting apparatus placed on the first measurement point to calculate new coordinates in the first coordinate system acquired by said first measurement, and thereby transform the coordinates acquired by the second measurement to the coordinates of the first coordinate system. Thus, a single plan view of the relevant scene components can be plotted using the respective coordinates acquired by first and second measurements.

Accordingly, even for a particular accident where the positions of all the relevant scene components cannot be measured from a single point, positions of all the relevant scene components can be measured and a substantially accurate sketch of the actual scene can be plotted by moving the position measuring/plotting apparatus from one point to another.

The invention allows a composite sketch to be plotted from data acquired by positioning measuring/plotting apparatus on different points. For example, positions of the scene components relating to a new traffic accident can be composed with the scene components relating to the traffic accident in the past, thereby the time needed for inspection of the actual site can be reduced, and a traffic snarl caused by such inspection can be minimized.

According to the invention, the scene components to be contained in a desired plan view are divided into immovable components and movable components, and data regarding these components are separately recorded, depending on whether the data are of immovable components or of movable components. For example, when it is desired to plot a sketch of an actual accident site, map data regarding roads, and the like, at the actual site, and accident data regarding the victim car(s) having caused the accident, may be separately recorded in preparation for another traffic accident possibly happening at the same site in the future. In such case, at least the map data can be utilized to expedite inspection of the site.

The capacity of the memory used exclusively to store the map data may be smaller than that of the memory used to store both the map data and the accident data, and thereby data processing is simplified.

Additionally, the invention allows the time necessary for measuring positions of the relevant scene components to be shortened substantially compared to conventional direct measurement using tapelines, or the like, and the time of a traffic blockade necessarily caused by inspection of the accident site is correspondingly shortened. Furthermore, the invention allows a sketch of the actual site to be immediately plotted on the site, which plot can be compared with the actual site to improve the accuracy of the written evidence made.

The embodiments of the invention in which an exclusive property or privilege is claimed are defined as follows:

1. A position measuring/plotting apparatus comprising:
   targets, each including a reflector means positioned within the target for reflecting a light beam projected thereon in a predetermined direction and light emitter means for projecting light beams used for target detection and superimposing various kinds of information on said light beams used for target detection;
   position detector means including coordinate detector means having its own light emitter to project a light beam on said target and a light receiver adapted to detect the light beam reflected on said target so that a distance, as well as a direction to said target, may be determined to detect spatial coordinates of said target, a light receiver to receive said light beams or target detection and information identifying means to identify said various kinds of information;
   processor means coupled to said position detector means used to process a plurality of spatial coordinates detected by said position detector means with respect to positions occupied by respective said targets and thereby to detect respective plane coordinates of said targets; and
   plan view plotter means coupled to said processor means to plot a plan view based on said plane coordinates detected by said processor means, wherein said light beams used for target detection are detected by said light receiver of said position detector memos whereby said spatial coordinates of the targets are detected.

2. The position measuring/plotting apparatus as defined in claim 1, wherein said target is fixedly mounted on a support rod having a tapered end adapted to be fixed into a surface at a position being measured.

3. The position measuring/plotting apparatus as defined in claim 2, wherein said various kinds of information superimposed on the light beams for target detection contain the information on a state of said supporting rod.

4. The position measuring/plotting apparatus as defined in claim 2, wherein a plurality of said targets are fixedly mounted on a supporting rod having tapered ends and wherein either end can be fixed into a road surface, or the like, at a position being measured.

5. The position measuring/plotting apparatus as defined in claim 4, wherein said various kinds of information superimposed on the light beam used for target detection contain information specifying the targets mounted on a supporting rod, from which the light beams for target detection are emitted.

6. The position measuring/plotting apparatus as defined in claim 4, wherein said various kinds of information superimposed on the light beams for target detection further contain information specifying the end of the supporting rod fixed into the road surface.

7. A position measuring/plotting system comprising:
   a first apparatus including target means placed at appropriate locations for reflecting a light beam projected thereon in a predetermined direction,
   position detector means having a light emitter to project a light beam on said target and a light receiver adapted to detect the light beam reflected from said target so that a distance, as well as a direction to said target, may be determined to detect spatial coordinates of said target,
   processor means coupled to said position detector means used to process a plurality of spatial coordinates detected by said position detector means with respect to a position occupied by respective ones of said targets, and thereby to detect respective plane coordinates of said targets,
   plan view plotter means coupled to said processor means to plot a plan view based on said plane coordinates detected by said processor means, and
   recording means for storing the data regarding said plan view;
   a second apparatus identical to said first apparatus;
   wherein said plan view plotter means plots a plan view of scene components using information from said first and second apparatuses, wherein two or more point positions are measured by said second apparatus to calculate second coordinates serving as reference coordinates which are then superimposed on first coordinates obtained by said first apparatus to calculate coordinates representing a position at which the second apparatus is set up, with respect to the coordinate system obtained by the first apparatus, and then coordinates of the scene components obtained by said second apparatus are combined with said coordinate system obtained by said first apparatus to plot said plan view.

8. The position measuring/plotting system as defined in claim 7, wherein each of said means are fixedly mounted on a respective supporting rod having at least one end adapted to be fixed into a surface at a position being measured.

9. The position measuring/plotting system as defined in claim 7, wherein each of said target means is provided with light emitter means adapted to project light beams for target detection and to superimpose various kinds of information on said light beams used for target detection, wherein said position detector means is provided with a light receiver adapted to detect said light beams for target detection, as well as information identifying means, specifying said various kinds of information superimposed on the light beams detected by said light receiver used for this purpose; and wherein said light beams for target detection are detected by said light receiver and thereby spatial coordinates of the target are determined.

10. A position measuring/plotting apparatus comprising:

target means each placed at an appropriate point for reflecting a light beam projected thereon in a predetermined direction;

position detector means having a light emitter to project a light beam on said target and a light receiver adapted to detect the light beam reflected by said target so that a distance, as well as a direction to said target, may be determined to detect spatial coordinates of said target;

processor means coupled to said position detector and adapted to process a plurality of spatial coordinates detected by said position detector means with respect to a respective position occupied by said targets, and thereby to detect respective plane coordinates of said targets;

a plan view plotter means to plot a plan view based on said plane coordinates detected by said processor means; and recording means to divide scene components contained in said plan view into immovable components and movable components, and separately storing the data regarding these immovable components and movable components, wherein said immovable components or said movable components are called from said recording means and provided to said plan view plotter means.

11. The position measuring/plotting apparatus as defined in claim 10, wherein said means are fixedly mounted on a supporting rod having at least one end adapted to be fixed into a surface or the like at a position being measured.

12. The position measuring/plotting apparatus as defined in claim 10, wherein each of said target means is provided with light emitters adapted to project light beams used exclusively for target detection and to superimpose various kinds of information on said light beams used for target detection, wherein said position detector means is provided with a light receiver adapted to detect said light beams for target detection, as well as identifying means specifying said various kinds of information, superimposed on said light beams detected by said light receiver used for this purpose; and wherein said light beams for target detection is detected by said light receiver for this purpose and thereby spatial coordinates of the target are determined.

13. A position indicator for use in a position measuring/plotting apparatus including a supporting rod having at least one end adapted to be fixed into a road surface, or the like, at a position being measured and targets fixedly mounted on said supporting rod to reflect a light beam projected thereon in a predetermined direction, said position measuring/plotting apparatus comprising:

position detector means having a light emitter to project a light beam on said target and a light receiver adapted to detect the light beam reflected on said target so that a distance, as well as a direction to said target, may be determined to detect spatial coordinated of said target;

processor means used to process a plurality of spatial coordinates having been detected by said position detector means with respect to positions occupied by said targets and thereby to detect respective plane coordinates of said targets; and plan view plotter means to plot a plan view based on said plane coordinates having been detected by said processor means.

14. The position indicator as defined in claim 13, wherein a plurality of said targets are fixedly mounted on said supporting rod and said supporting rod has its longitudinally opposite ends selectively one of which can be fixed into a road surface, or the like, at a position being measured.

15. The position indicator according to claim 14, wherein a pair of said targets are fixedly mounted on said supporting rod with a distance from the one target to the end of the supporting rod adjacent said one target being substantially one-half of a distance from said end of the supporting rod to the other target.

16. The position indicator as defined in claim 13, wherein each of said targets is provided with a light emitter used to project a light beam for target detection in a predetermined direction and to superimpose various kinds of information on said light beam for target detection.

* * * * *

UNITED STATES PATENT AND TRADEMARK OFFICE
CERTIFICATE OF CORRECTION

PATENT NO. : 5,361,217
DATED : November 1, 1994
INVENTOR(S) : Kazuo Makimura, Shigeru Kojima and Haruo Kakizawa It is certified that error appears in the above-indentified patent and that said Letters Patent is hereby corrected as shown below:

Column 6, line 56:
 After "$(Ea + Eb) - (Ec + Ed) = K$"
 "(2)" should be --(1)--.

Column 12, line 14:
 "pertbrmed" should be --performed--.

Column 14, line 39:
 "$T_2$" should be --$T_1$--.

Column 16, line 33:
 "$YB(4) - YB(3) - Y1$" should be
 --$YB(4) = YB(3) - Y1$--.

Column 19, claim 1, line 60:
 "memos" should be --means--.

Signed and Sealed this

Twenty-sixth Day of September, 1995

Attest:

BRUCE LEHMAN

*Attesting Officer*  *Commissioner of Patents and Trademarks*